(12) United States Patent
Kuroiwa

(10) Patent No.: US 7,775,702 B2
(45) Date of Patent: Aug. 17, 2010

(54) LIQUID CRYSTAL DISPLAY DEVICE, LIGHT SOURCE HOLDER, LIGHT SOURCE-HOUSING MEMBER, AND BACKLIGHT

(75) Inventor: Hironori Kuroiwa, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 12/091,080

(22) PCT Filed: Aug. 23, 2006

(86) PCT No.: PCT/JP2006/316520

§ 371 (c)(1),
(2), (4) Date: Apr. 22, 2008

(87) PCT Pub. No.: WO2007/094095

PCT Pub. Date: Aug. 23, 2007

(65) Prior Publication Data

US 2009/0122520 A1    May 14, 2009

(30) Foreign Application Priority Data

Feb. 13, 2006  (JP) ............................. 2006-035658
Apr. 20, 2006  (JP) ............................. 2006-117025

(51) Int. Cl.
*F21V 33/00*    (2006.01)

(52) U.S. Cl. ...................... 362/634; 362/97.1; 362/97.2

(58) Field of Classification Search ....... 362/97.1–97.3, 362/217.11, 217.12, 219, 632–634
See application file for complete search history.

(56) References Cited

U.S. PATENT DOCUMENTS

| 5,280,372 A | 1/1994 | Horiuchi |
| 5,820,254 A * | 10/1998 | Duenas ........................ 362/473 |
| 6,513,944 B2 * | 2/2003 | Chou .......................... 362/633 |
| 6,857,759 B2 * | 2/2005 | Lee et al. ..................... 362/225 |
| 2001/0010568 A1 | 8/2001 | Nakano |
| 2004/0257492 A1 * | 12/2004 | Mai et al. ..................... 349/61 |
| 2005/0276076 A1 * | 12/2005 | Shin ............................ 362/633 |

FOREIGN PATENT DOCUMENTS

| JP | 07-296618 A | 11/1995 |
| JP | 11-002813 A | 1/1999 |
| JP | 2004-251931 A | 9/2004 |

OTHER PUBLICATIONS

Official communication issued in the International Application No. PCT/JP2006/316520, mailed on Nov. 21, 2006.

* cited by examiner

*Primary Examiner*—Laura Tso
(74) *Attorney, Agent, or Firm*—Keating & Bennett, LLP

(57) ABSTRACT

A liquid crystal display device, a light source holder, a light source housing member, and a backlight, permit light sources to be easily exchanged and effectively prevent generation of defects such as deformation of light source holding members and an inability of the members to be inserted and pulled out. The backlight includes a light source holder and a light source housing member, the light source housing member housing the light source holder, wherein at least one of the light source holder and the light source housing member has a projection portion, and the light source holder and the light source housing member are in contact with each other at the projection portion.

19 Claims, 13 Drawing Sheets

LIQUID CRYSTAL DISPLAY DEVICE, LIGHT SOURCE HOLDER, LIGHT SOURCE-HOUSING MEMBER, AND BACKLIGHT

BACKGROUND OF THE INVENTION

1. Field of the Invention

The present invention relates to a liquid crystal display device, a light source holder, a light source housing member, and a backlight. More specifically, the present invention relates to a liquid crystal display device, a light source holder, a light source housing member, and a backlight, preferably used in a TV, a monitor for personal computers and the like.

2. Description of the Related Art

A liquid crystal display device is a display device with low electrical power consumption and can be lightened and thinned. Therefore, the liquid crystal display device has been widely used in a TV, a monitor for personal computers, and the like. Such a liquid crystal display device is not a self light-emitting type display device, and therefore generally includes a backlight as a light supply source, in addition to a liquid crystal display panel which has a function of shielding light.

A direct-type backlight and an edge-type backlight have been commonly used as the backlight. The both backlights supply planar light for a liquid crystal display panel. The direct-type backlight has a light source just below a light-emitting surface. Therefore, such a direct-type backlight has advantages such as high luminance and high light use efficiency, and it can be increased in size. The edge-type backlight has a light guide plate disposed on a light-emitting surface and light sources arranged on the side of the light guide plate. Therefore, such an edge-type backlight has advantages such as low electrical power consumption, and it can be decreased in thickness.

The lifetime of the liquid crystal display device largely depends on a lifetime of a light source included in such a backlight. The liquid crystal display device generally continues to function as long as the light source emits light well. Therefore, a liquid crystal display device which permits exchange of the light sources has been much needed as a liquid crystal display device which frequently performs display, particularly for a liquid crystal display device for industrial devices which generally performs display continuously, because, in such a display device, light sources have a particularly short lifetime.

With respect to a liquid crystal display device including an edge-type backlight, a technology of integrating a light source with a reflector and removably fitting the reflector with a slide mechanism formed in a holding case is disclosed (for example, refer to Japanese Kokai Publication No. Hei-06-51293). However, in such a liquid crystal display device, defects are generated. For example, the reflector is deformed when inserted into the holding case, and the reflector cannot be inserted and pulled out of the holding case. Further, there is no disclosure about a method of exchanging a light source in a liquid crystal display device including a direct-type backlight. Accordingly, such a liquid crystal display device has room for improvement in order to easily exchange the light source without generation of any defects.

Further, with respect to a liquid crystal display device including a direct-type backlight, a backlight in which lamps (light sources) can be exchanged, the luminance and the light uniformity are high, and the lifetime is long is disclosed (for example, refer to Japanese Kokai Publication No. Hei-11-2813). According to this technology, the lamps are arranged in a plurality of reflectors, one to each reflector. Therefore, the lamps are exchanged one by one. However, it is preferable that all of the light sources are exchanged at one time, from viewpoint of suppressing uneven luminance after the light sources are exchanged. Accordingly, such a liquid crystal display device including a direct type backlight needs to be more improved in order to exchange the lamps with efficiency.

SUMMARY OF THE INVENTION

In order to overcome the problems described above, preferred embodiments of the present invention provide a liquid crystal display device, a light source holder, a light source housing member, and a backlight, which permit light sources to be easily exchanged and effectively prevent generation of defects such as deformation of light source holding members and an inability of the members to be inserted and pulled out.

The present inventors made various investigations of a liquid crystal display device which permits light sources to be easily exchanged and effectively prevents defects such as deformation of light source holding members and an inability of the members to be inserted and pulled out. The inventors noted configurations of a light source holder which holds the light sources and a light source housing member within which the light source holder is housed. The inventors discovered that in a conventional backlight, even if the light source holder can be detached from the light source housing member, a pressure of the light source housing member to the light source holder is generally large in a completed backlight, and therefore the friction between the light source holder and the light source housing member becomes larger, which makes it difficult to insert and pull out the light source holder. The inventors discovered that if at least one of the light source holder and the light source housing member has at least one of a projection portion and a curved portion and the light source holder and the light source housing member are in contact with each other at the above-mentioned projection portion and/or the above-mentioned curved portion, the defects such as deformation of the light source holder at the time when the light source holder is inserted into the light source housing member, and an inability of it to be inserted and pulled out are effectively prevented, and the light sources can be easily exchanged. Further, the present inventors discovered that also in the case where the backlight includes a sliding member for sliding the light source holder, the defects such as deformation of the light source holding member and the sliding member and an inability of them to be inserted and pulled out are effectively prevented and the light sources can be easily exchanged if at least one of the sliding member and the light source housing member has at least one of a projection portion and a curved portion and the sliding member and the light source housing member are in contact with each other at the above-mentioned projection portion and/or the above-mentioned curved portion. As a result, the above-mentioned problems have been admirably solved, leading to completion of preferred embodiments of the present invention.

That is, a preferred embodiment of the present invention relates to a liquid crystal display device including a backlight, the backlight including a light source holder and a light source housing member, the light source housing member housing the light source holder, wherein at least one of the light source holder and the light source housing member has a projection portion, and the light source holder and the light source housing member are in contact with each other at the projection portion (herein after, also referred to as "the first liquid crystal display device according to a preferred embodiment of the present invention").

A preferred embodiment of the present invention also provides a liquid crystal display device including a backlight, the backlight including a light source holder and a light source housing member, the light source housing member housing the light source holder, wherein at least one of the light source holder and the light source housing member has a curved portion, and the light source holder and the light source housing member are in contact with each other at the curved portion (herein after, also referred to as "the second liquid crystal display device according to a preferred embodiment of the present invention").

An other preferred embodiment of the present invention provides a liquid crystal display device including a backlight, the backlight including a light source holder, a sliding member, and a light source housing member, the light source housing member integrally housing the light source holder and the sliding member, wherein at least one of the sliding member and the light source housing member has a projection portion, and the sliding member and the light source housing member are in contact with each other at the projection portion (herein after, also referred to as "the third liquid crystal display device according to a preferred embodiment of the present invention").

A further preferred embodiment of the present invention provides a liquid crystal display device including a backlight, the backlight including a light source holder, a sliding member, and a light source housing member, the light source housing member integrally housing the light source holder and the sliding member, wherein at least one of the sliding member and the light source housing member has a curved portion, and the sliding member and the light source housing member are in contact with each other at the curved portion (herein after, also referred to as "the fourth liquid crystal display device according to a preferred embodiment of the present invention"). The first liquid crystal display device according to a preferred embodiment of the present invention is described in more detail below.

The first liquid crystal display device according to a preferred embodiment of the present invention includes a backlight including a light source holder and a light source housing member. The light source housing member houses the light source holder. The backlight means a device for illuminating a liquid crystal display panel included in the liquid crystal display device. The backlight preferably includes a light source, the light source holder, the light source housing member, and the like as a component. The first liquid crystal display device according to a preferred embodiment of the present invention may or may not include other components as long as it essentially includes such components. The configuration thereof is not especially limited. However, the first liquid crystal display device generally includes a light source and a liquid crystal display panel. With respect to the liquid crystal display panel in the first liquid crystal display device according to a preferred embodiment of the present invention, the panel has a common configuration, and a display system such as a liquid crystal mode and a liquid crystal driving system is not especially limited. Examples of the liquid crystal mode include a TN (Twist Nematic) mode, a STN (Super Twist Nematic) mode, and an IPS (In Plane Switching) mode. A passive matrix driving system, an active matrix driving system, and the like may be mentioned as the liquid crystal driving system.

The above-mentioned light source is not especially limited. A cold cathode fluorescent tube (herein after, also referred to as a "CCFT") that is a linear light source, a light-emitting diode (herein after, also referred to as an "LED") that is a point light source, and the like are preferable. The use of the CCFT permits an increase in luminance and a reduction in space for the backlight. The use of the LED permits a reduction in electrical power consumption, an increase in lifetime, and an enlargement of a color reproduction range due to an increase in display colors.

The above-mentioned light source holder has a function of holding a light source. The preferred embodiments in which the light source holder holds the light source are not especially limited. However, if a linear light source is used, it is preferable that the light source holder holds ends of the linear light source in view of improvement in light use efficiency. The material for the light source holder is not especially limited. It is preferable that the light source holder includes a material excellent in heat conductivity in order to efficiently release heat generated in the light source to the outside. Further, it is preferable that such a material is excellent in processability. For example, a metal is preferably used. It is more preferable that the material includes aluminum that is cheap and light. It is preferable that the light source holder also serves as a reflector which reflects light emitted from the light source in view of improvement in light use efficiency.

The above-mentioned light source housing member houses the light source holder and has a function of holding the light source holder. It is preferable that the light source housing member integrally holds components included in a common liquid crystal display device, such as a liquid crystal display panel and a light guide plate, in addition to the light source holder. That is, it is preferable that the light source housing member also serves as a bezel. The light source housing member preferably is generally composed of a plurality of members. In this case, as long as the plurality of members can together hold the light source holder, those members are not especially limited. According to the above-mentioned liquid crystal display device, another member may or may not be further arranged on the outside of the light source housing member. The material for the light source housing member is not especially limited. It is preferable that the light source housing member includes a material excellent in heat conductivity from the same viewpoints as in the light source holder. Further, it is preferable that such a material is excellent in processability. For example, a metal is preferably used. It is more preferable that the material includes aluminum that is cheap and light.

The above-mentioned light source holder is housed within the light source housing member. According to this, the light sources and the light source holder are slid, thereby being inserted and pulled out of the backlight. In such a manner, the light sources can be exchanged. Thus, according to the first liquid crystal display device of a preferred embodiment of the present invention, the light source holder has a function of sliding itself. The shapes of the light source holder and the light source housing member are not especially limited as long as the light source holder can be slid along the light source housing member. In order to secure a path of light emitted from the light source, it is preferable that the light source holder and the light source housing member have a shape which does not interrupt the path. Particularly, it is more preferable that the light source holder is a substantially rectangular or substantially plate body, at least one surface of which is opened.

At least one of the above-mentioned light source holder and the light source housing member has a projection portion, and the light source holder and the light source housing member are in contact with each other at the above-mentioned projection portion. That is, at least one of the above-mentioned light source holder and the light source housing member has a projection portion, and the light source holder and the light source housing member are in contact with each other at the above-mentioned projection portion. According to this, a contact area between the light source holder and the light source housing member can be reduced. Therefore, the defects such as deformation of the light source holder and an inability of it to be inserted and pulled out can be effectively prevented, and the light sources can be easily exchanged. In order to sufficiently exhibit such effects of preferred embodiments of the present invention, it is preferable in the first liquid crystal display device according to a preferred embodiment of the present invention that the projection portion reduces friction between the light source holder and the light source housing member. Accordingly, the above-mentioned projection portion is clearly distinguished from other projection portions which are provided for the light source holder and/or the light source housing member just due to design reasons. The shape of the projection portion is not especially limited as long as the contact area between the light source holder and the light source housing member is reduced. It is preferable that the projection portion has a cross section with a polygonal shape such as a substantially quadrangular shape and a substantially triangular shape; a substantially semicircular shape such as a semicircular shape and a semi-elliptical shape; or a wave shape. The number of the projection portion is not especially limited. It is preferable that a plurality of the projection portions are arranged in order to sufficiently secure a holding stability of the light source holder. It is more preferable that a plurality of the projection portions are arranged substantially equally spaced apart in a region where the light source holder faces the light source housing member. The material for the projection portion is not especially limited. The same material as in the light source holder or the light source housing member is preferable. According to this, the projection portion can be integrally formed with the light source holder or the light source housing member, which leads to simplification of the production processes.

According to the first liquid crystal display device according to a preferred embodiment of the present invention, the system of the backlight is not especially limited. However, a direct-type or edge-type (side-type) backlight is preferable in view of the versatility. If the first liquid crystal display device according to a preferred embodiment of the present invention includes a direct-type backlight, it is preferable that the backlight includes a light source behind a liquid crystal display panel, and the light source holder is arranged in a peripheral region of the light source other than a region between the liquid crystal display panel and the light source. As a result, in the liquid crystal display device including the direct-type backlight, the defects such as deformation of the light source holding members and an inability of them to be inserted and pulled out can be effectively prevented and the light sources can be easily exchanged.

If the first liquid crystal display device according to a preferred embodiment of the present invention includes an edge-type backlight, it is preferable that the backlight further includes a light guide plate behind a liquid crystal display panel, a light source is arranged on a side of the light guide plate, and the light source holder is arranged in a peripheral region of the light source other than a region between the light guide plate and the light source. As a result, in the liquid crystal display device including the edge-type backlight, the defects such as deformation of the light source holding members and an inability of them to be inserted and pulled out can be effectively prevented and the light sources can be easily exchanged. Particularly in the edge-type backlight, the light source holder is generally long and thin, and weak in strength, and housed in a very narrow space. Therefore, the defects such as deformation of the light source holder and an inability of it to be inserted and pulled out are easily generated when the light source is exchanged. Accordingly, the liquid crystal display device including the edge-type backlight to which preferred embodiments of the present invention are applied can exhibit more significantly the effects of the present invention.

If the first liquid crystal display device according to a preferred embodiment of the present invention includes an edge-type backlight, at least one of the above-mentioned light source holder and the above-mentioned light source housing member preferably includes the projection portion on the front surface side or the back surface side (1), and more preferably includes the projection portion on the front surface side (2). According to the above-mentioned preferred embodiment (1), a space where a lead wire of the light source is arranged can be surely secured. According to the above-mentioned preferred embodiment (2), heat of the light source can be efficiently released from the back surface side of the light source holder. Therefore, it is possible to keep the display qualities of the liquid crystal display panel to be excellent. In the present description, the front surface side and the back surface side mean the light-emitting surface side and the opposite side of the backlight, respectively, under the state where the light source holder and the light source housing member are equipped with the backlight.

In the present description, the above-mentioned "light source housing member has the projection portion (member) on the front surface side or the back surface side" means that the light source housing member arranged on the front surface side or the back surface side of the backlight has the projection portion (member) in the region where the light source housing member faces the light source holder.

The second liquid crystal display device according to another preferred embodiment of the present invention is described in more detail below. The common members between the second liquid crystal display device according to a preferred embodiment of the present invention and the first liquid crystal display device according to a preferred embodiment of the present invention are not explained in detail because they have been already mentioned in the first liquid crystal display device according to a preferred embodiment of the present invention.

The second liquid crystal display device according to a preferred embodiment of the present invention includes the curved portion instead of the projection portion in the first liquid crystal display device according to a preferred embodiment of the present invention. Therefore, as in the first liquid crystal display device according to a preferred embodiment of the present invention, the defects such as deformation of the light source holder and an inability of it to be inserted and pulled out can be effectively prevented and the light sources can be easily exchanged. The shape of the curved portion is not especially limited as long as the contact area between the light source holder and the light source housing member is reduced. It is preferable that the curved portion has a cross section with a circular arc or elliptical arc shape. The number of the curved portions is not especially limited. A preferred embodiment in which one curved portion is arranged in the entire region where the light source holder faces the light source housing member and a preferred embodiment in which a plurality of curved portions are arranged substantially equally spaced apart in the region where the light source holder faces the light source housing member are preferable in order to sufficiently secure the holding stability of the light source holder, attributed to the light source housing member. The material for the curved portion is not especially limited. The same material as in the light source holder or the light source housing member is preferable. According to this, the curved portion can be integrally formed with the light source holder or the light source housing member, which leads to simplification of the production processes.

The second liquid crystal display device according to a preferred embodiment of the present invention may or may not include other components as long as it includes such components. The configuration thereof is not especially limited. However, the second liquid crystal display device generally includes a liquid crystal display panel. In the second liquid crystal display device according to a preferred embodiment of the present invention, the liquid crystal display panel has a common configuration, and the display system such as the liquid crystal mode and the liquid crystal driving system, mentioned in the first liquid crystal display device according to a preferred embodiment of the present invention, is mentioned.

The configuration other than the curved portion of the liquid crystal display device according to a preferred embodiment of the present invention is preferably the same as the configuration other than the projection of the liquid crystal display device of the present invention. Therefore, also in the second liquid crystal display device of the present invention, it is preferable that the curved portion reduces friction between the light source holder and the light source housing member from the same viewpoint as in the first liquid crystal display device according to a preferred embodiment of the present invention. It is preferable that the backlight includes a light source behind a liquid crystal display panel, and the light source holder is arranged in a peripheral region of the light source other than a region between the liquid crystal display panel and the light source. In addition, a preferred embodiment in which the backlight further includes a light guide plate behind a liquid crystal display panel, a light source is arranged on a side of the light guide plate, and the light source holder is arranged in a peripheral region of the light source other than a region between the light guide plate and the light source (herein after, also referred to as "the first preferred embodiment") is preferable. According to the above-mentioned first preferred embodiment, it is preferable that at least one of the light source holder and the light source housing member has the curved portion on the front surface side or the back surface side. It is more preferable that at least one of the light source holder and the light source housing member has the curved portion on the front surface side.

The other preferred embodiments mentioned in the first liquid crystal display device of the present invention can be applied to the second liquid crystal display device of the present invention if necessary.

The third liquid crystal display device according to a preferred embodiment of the present invention is described in more detail below. The common members between the third liquid crystal display device according to a preferred embodiment of the present invention and the first liquid crystal display device according to a preferred embodiment of the present invention are not explained in detail because they have been already mentioned in the first liquid crystal display device according to a preferred embodiment of the present invention.

The third liquid crystal display device according to a preferred embodiment of the present invention includes a backlight including a light source holder, a sliding member, and a light source housing member. The light source housing member integrally houses the light source holder and the sliding member. The third liquid crystal display device according to a preferred embodiment of the present invention may or may not include other components as long as it essentially includes such components. The configuration thereof is not especially limited. However, the third liquid crystal display device generally includes a liquid crystal display panel. In the third liquid crystal display device according to a preferred embodiment of the present invention, the liquid crystal display panel has a common configuration, and the display system such as the liquid crystal mode and the liquid crystal driving system, mentioned in the first liquid crystal display device according to a preferred embodiment of the present invention, is mentioned.

The above-mentioned sliding member has a function of sliding the light source holder. The sliding member is generally fixed to the light source holder. The light source holder and the sliding member are integrally housed within the light source housing member. According to this, the light sources, the light source holder, and the light source holder are slid, thereby being inserted and pulled out of the backlight. In such a manner, the light sources can be exchanged. The shape of the sliding member is not especially limited as long as the sliding member can be slid along the light source housing member. In order to reduce a contact area between the sliding member and the light source housing member, it is preferable that the sliding member has a substantially straight-line shape (substantially bar shape). The material for the sliding member is not especially limited. A resin excellent in at least one of smoothing property, processability, strength, and heat stability is preferable. Particularly, a resin excellent in smoothing property, processability, strength, and heat stability is more preferable. For example, polycarbonate is preferable.

The backlight in the third liquid crystal display device according to a preferred embodiment of the present invention includes the sliding member which slides the light source holder. Accordingly, the light source holder may or may not have a function of sliding itself in the third liquid crystal display device according to a preferred embodiment of the present invention.

At least one of the above-mentioned sliding member and the above-mentioned light source housing member has a projection portion and the sliding member and the light source housing member are in contact with each other at the projection portion. That is, at least one of the above-mentioned sliding member and the above-mentioned light source housing member has a projection portion and the sliding member and the light source housing member are in contact with each other at the projection portion. According to this, the defects such as deformation of the light source holder and the sliding member and an inability of them to be inserted and pulled out can be effectively prevented and the light sources can be easily exchanged, as in the first liquid crystal display device according to a preferred embodiment of the present invention. The shape of the projection portion is not especially limited as long as the contact area between the sliding member and the light source housing member is reduced. It is preferable that the projection portion has a cross section with a polygonal shape such as a substantially quadrangular shape and a substantially triangular shape; a substantially semicircular shape such as a semicircular shape and a semi-elliptical shape; or a wave shape. The number of the projection portions is not especially limited. It is preferable that a plurality of the projection portions are arranged in order to sufficiently secure the holding stability of the light source holder and the sliding member, attributed to the light source holding member. It is more preferable that a plurality of the projection portions are arranged substantially equally spaced apart in a region where the sliding member faces the light source housing member. The material for the projection portion is not especially limited. The same material as in the sliding member or the light source housing member is preferable. According to this, the projection portion can be integrally formed with the sliding member or the light source housing member, which leads to simplification of the production processes. It is preferable that the projection portion reduces friction between the sliding member and the light source housing member in order to sufficiently exhibit such effects of preferred embodiments of the present invention.

According to the third liquid crystal display device according to a preferred embodiment of the present invention, the system of the backlight is not especially limited. However, a direct-type backlight is preferable in view of the versatility and ease of design. That is, it is preferable that the backlight includes a light source behind a liquid crystal display panel, the light source holder is arranged in a peripheral region of the light source other than a region between the liquid crystal display panel and the light source, and the sliding member is arranged on both ends of the liquid source holder and has the projection portion on a back surface side. As a result, in the liquid crystal display device including the direct-type backlight, the defects such as deformation of the light source holding member (the light source holder) and the light source-sliding member (the sliding member) and an inability of them to be inserted and pulled out can be effectively prevented and the light sources can be easily exchanged. The above-mentioned "sliding member is arranged on both ends of the light source holder" means that the sliding member is arranged at two ends (peripheral regions) facing each other of the light source holder when viewed from the light-emitting surface side. In the direct-type backlight, the shape of the light source holder when viewed from the light-emitting surface side (plane shape) is generally a substantially square shape. A preferred embodiment in which the sliding member is arranged along two sides facing each other of the light source holder whose plane shape is a substantially square shape is preferable. Further, a preferred embodiment in which the sliding member having a substantially linear shape is arranged on the back surface side along two sides facing each other of the light source holder whose plane shape is a substantially square shape is more preferable.

If the third liquid crystal display device according to a preferred embodiment of the present invention includes a direct-type backlight, it is preferable that the backlight includes a plurality of light source holders juxtaposed to each other, and at least one of the plurality of light source holders holds a plurality of light sources. It is more preferable that the backlight includes a plurality of light source holders juxtaposed to each other and each of the plurality of light source holders holds a plurality of light sources. In the direct-type backlight, as the liquid crystal display panel becomes larger, the light source holder also becomes larger. Accordingly, it is generally difficult to maintain the strength of the light source holder if the panel becomes larger. However, if a plurality of separate light source holders are arranged as mentioned above, the strength of the light source holders can be sufficiently secured even if the panel is large. In addition, if the light source holder holds a plurality of light sources, the plurality of light sources can be exchanged at one time, and therefore the light sources can be efficiently exchanged. The number of the light source holders juxtaposed to each other may be appropriately determined. It is preferable that two or more light source holders are arranged in order to secure the strength of the light source holders and the efficiency of the exchange of the light sources. The number of the light sources held by each light source holder may be appropriately determined depending on a desired luminance.

The fourth liquid crystal display device according to a preferred embodiment of the present invention is described in more detail below. The common members between the fourth liquid crystal display device according to a preferred embodiment of the present invention and the first and third liquid crystal display devices according to other preferred embodiments of the present invention are not explained in detail because they have been already mentioned in the first and third liquid crystal display devices according to other preferred embodiments of the present invention.

The fourth liquid crystal display device according to a preferred embodiment of the present invention includes the curved portion instead of the projection portion in the third liquid crystal display device of the present invention. Therefore, as in the third liquid crystal display device according to a preferred embodiment of the present invention, the defects such as deformation of the light source holder and the sliding member and an inability of them to be inserted and pulled out can be effectively prevented and the light sources can be easily exchanged. The shape of the curved portion is not especially limited as long as the contact area between the sliding member and the light source housing member is reduced. It is preferable that the curved portion has a cross section with a circular arc or elliptical arc shape. The number of the curved portion is not especially limited. A preferred embodiment in which one curved portion is arranged in the entire region where the sliding member faces the light source housing member and a preferred embodiment in which a plurality of the curved portions are arranged substantially equally spaced apart in the region where the sliding member faces the light source housing member are preferable in order to sufficiently secure the holding stability of the light source holder and the sliding member, attributed to the light source holding member. The material for the curved portion is not especially limited. The same material as in the sliding member or the light source housing member is preferable. According to this, the curved portion can be integrally formed with the sliding member or the light source housing member, which leads to simplification of the production processes.

The fourth liquid crystal display device according to a preferred embodiment of the present invention may or may not include other components as long as it essentially includes such components. The configuration thereof is not especially limited. However, the fourth liquid crystal display device generally includes a liquid crystal display panel. In the fourth liquid crystal display device according to a preferred embodiment of the present invention, the liquid crystal display panel has a common configuration, and the display system such as the liquid crystal mode and the liquid crystal driving system, mentioned in the first liquid crystal display device according to a preferred embodiment of the present invention, is mentioned.

The configuration other than the curved portion of the fourth liquid crystal display device according to a preferred embodiment of the present invention is the same as the configuration other than the projection portion of the third liquid crystal display device according to a preferred embodiment of the present invention. Therefore, also in the fourth liquid crystal display device according to a preferred embodiment of the present invention, it is preferable that the curved portion reduces friction between the sliding member and the light source housing member from the same viewpoint as in the third liquid crystal display device according to a preferred embodiment of the present invention. A preferred embodiment in which the backlight includes a light source behind a liquid crystal display panel, the light source holder is arranged in a peripheral region of the light source other than a region between the liquid, crystal display panel and the light source, and the sliding member is arranged on both ends of the liquid source holder and has the curved portion on a back surface side (hereinafter, also referred to as "the second preferred embodiment") is preferable. According to the above-mentioned second preferred embodiment, it is preferable that the backlight includes a plurality of light source holders juxtaposed to each other and at least one of the plurality of light source holders holds a plurality of light sources. It is more preferable that the backlight includes a plurality of light source holders juxtaposed to each other, and each of the plurality of light source holders holds a plurality of light sources.

The other preferred embodiments mentioned in the first and third liquid crystal display devices of the present invention can be applied to the fourth liquid crystal display device of the present invention if necessary.

As mentioned above, according to the first and second liquid crystal display devices according to preferred embodiments of the present invention, at least one of the light source holder and the light source housing member has the projection portion or the curved portion and the light source holder and the light source housing member are in contact with each other at the projection portion or the curved portion. Thereby, the effects of the present invention can be obtained. Accordingly, a preferred embodiment of the present invention also provides a light source holder, a light source housing member, and a backlight, each including such a projection portion or curved portion. According to the third and fourth liquid crystal display devices according to preferred embodiments of the present invention, at least one of the sliding member and the light source housing member has the projection portion or the curved portion and the sliding member and the light source housing member are in contact with each other at the projection portion or the curved portion. Thereby, the effects of the present invention can be obtained. Accordingly, a preferred embodiment of the present invention also provides a backlight having such a projection portion or curved portion.

That is, a preferred embodiment of the present invention also provides a light source holder housed within a light source housing member, including a projection portion for reducing friction (also referred to as "the first light source holder according to a preferred embodiment of the present invention"). According to a liquid crystal display device including such a light source holder, defects such as deformation of the light source holder and an inability of it to be inserted and pulled out can be effectively prevented and light sources can be easily and safely exchanged. Accordingly, the first light source holder according to a preferred embodiment of the present invention can be preferably used in a backlight.

The first light source holder according to a preferred embodiment of the present invention may or may not include other components as long as it essentially includes such components. The configuration thereof is not especially limited. The same preferred embodiment as in the light source holder included in the first liquid crystal display device of the present invention may be mentioned as a preferable embodiment of the first light source holder of the present invention. Particularly, it is preferable that the first light source holder according to a preferred embodiment of the present invention is a light source holder for an edge-type or direct-type backlight. If the first light source holder according to a preferred embodiment of the present invention is a light source holder for an edge-type backlight, it is preferable that the light source holder has the projection portion on a front surface side or a back surface side. It is more preferable that the light source holder has the projection portion on the front surface side.

A preferred embodiment of the present invention also provides a light source holder housed within a light source housing member, including a curved portion for reducing friction (herein after, also referred to as "the second light source holder according to a preferred embodiment of the present invention"). According to a liquid crystal display device including such a light source holder, defects such as deformation of the light source holder and an inability of it to be inserted and pulled out can be effectively prevented and light sources can be easily and safely exchanged. Accordingly, the second light source holder according to a preferred embodiment of the present invention can be preferably used in a backlight.

The second light source holder according to a preferred embodiment of the present invention may or may not include other components as long as it essentially includes such components. The configuration thereof is not especially limited. The same preferred embodiment as in the light source holder included in the second liquid crystal display device according to a preferred embodiment of the present invention may be mentioned as a preferable embodiment of the second light source holder of the present invention. Particularly, it is preferable that the second light source holder according to a preferred embodiment of the present invention is a light source holder for an edge-type or direct-type backlight. If the second light source holder according to a preferred embodiment of the present invention is a light source holder for an edge-type backlight, it is preferable that the light source holder has the curved portion on a front surface side or a back surface side. It is more preferable that the light source holder has the curved portion on the front surface side.

A preferred embodiment of the present invention provides a light source housing member housing a light source holder, including a projection portion for reducing friction (herein after, also referred to as "the first light source housing member according to a preferred embodiment of the present invention"). According to a liquid crystal display device including such a light source housing member, defects such as deformation of the light source holder and an inability of it to be inserted and pulled out can be effectively prevented and light sources can be easily exchanged. Accordingly, the first light source housing member according to a preferred embodiment of the present invention can be preferably used in a backlight.

The first light source housing member according to a preferred embodiment of the present invention may or may not include other components as long as it essentially includes such components. The configuration thereof is not especially limited. The same preferred embodiment as in the light source housing member included in the first liquid crystal display device according to a preferred embodiment of the present invention may be mentioned as a preferable embodiment of the first light source housing member of the present invention. Particularly, it is preferable that the first light source housing member according to a preferred embodiment of the present invention is a light source housing member for an edge-type or direct-type backlight. If the first light source housing member according to a preferred embodiment of the present invention is a light source housing member for an edge-type backlight, it is preferable that the light source housing member has the projection portion on a front surface side or a back surface side. It is more preferable that the light source housing member has the projection portion on the front surface side.

A preferred embodiment of the present invention also provides a light source housing member housing a light source holder, including a curved portion for reducing friction (herein after, also referred to as "the second light source housing member according to a preferred embodiment of the present invention"). According to a liquid crystal display device including such a light source housing member, defects such as deformation of the light source holder and an inability of it to be inserted and pulled out can be effectively prevented and light sources can be easily exchanged. Accordingly, the second light source housing member according to a preferred embodiment of the present invention can be preferably used in a backlight.

The second light source housing member according to a preferred embodiment of the present invention may or may not include other components as long as it essentially includes such components. The configuration thereof is not especially limited. The same preferred embodiment as in the light source housing member included in the second liquid crystal display device according to a preferred embodiment of the present invention may be mentioned as a preferable embodiment of the second light source housing member of the present invention. Particularly, it is preferable that the second light source housing member according to a preferred embodiment of the present invention is a light source housing member for an edge-type or direct-type backlight. If the second light source housing member according to a preferred embodiment of the present invention is a light source housing member for an edge-type backlight, it is preferable that the light source housing member has the curved portion on a front surface side or a back surface side. It is more preferable that the light source housing member has the curved portion on the front surface side.

A preferred embodiment of the present invention also provides a backlight including: a light source holder; and a light source housing member, the light source housing member housing the light source holder, wherein at least one of the light source holder and the light source housing member has a projection portion, and the light source holder and the light source housing member are in contact with each other at the projection portion (herein after, also referred to as "the first backlight according to a preferred embodiment of the present invention"). According to a liquid crystal display device including such a backlight, defects such as deformation of the light source holder and an inability of it to be inserted and pulled out can be effectively prevented and light sources can be easily exchanged. Accordingly, the first backlight according to a preferred embodiment of the present invention can be preferably used in a liquid crystal display device.

The first backlight according to a preferred embodiment of the present invention may or may not include other components as long as it essentially includes such components. The configuration thereof is not especially limited. As preferable embodiments of the projection portion, the light source holder, and the light source housing member in the first backlight according to a preferred embodiment of the present invention, the same preferred embodiments as in the projection portion, the light source holder, and the light source housing member in the first liquid crystal display device according to a preferred embodiment of the present invention may be mentioned. Particularly, it is preferable that the projection portion reduces friction between the light source holder and the light source housing member. It is preferable that the backlight includes a light source behind a light-emitting surface of the backlight, and the light source holder is arranged in a peripheral region of the liquid source other than a region between the light-emitting surface of the backlight and the light source. Further, a preferred embodiment in which the backlight further includes a light guide plate behind a light-emitting surface of the backlight, the light source is arranged on a side of the light guide plate, and the light source holder is arranged in a peripheral region of the light source other than a region between the light guide plate and the light source (herein after, also referred to as "the third embodiment") is preferable. According to the third preferred embodiment, it is preferable that at least one of the light source holder and the light source housing member has the projection portion on a front surface side or a back surface side, and it is more preferable that at least one of the light source holder and the light source housing member has the projection portion on the front surface side.

A preferred embodiment of the present invention provides a backlight including: a light source holder; and a light source housing member, the light source housing member housing the light source holder, wherein at least one of the light source holder and the light source housing member has a curved portion, and the light source holder and the light source housing member are in contact with each other at the curved portion (herein after, also referred to as "the second backlight according to a preferred embodiment of the preset invention"). According to a liquid crystal display device including such a backlight, defects such as deformation of the light source holder and an inability of it to be inserted and pulled out can be effectively prevented and light sources can be easily exchanged. Accordingly, the second backlight according to a preferred embodiment of the present invention can be preferably used in a liquid crystal display device.

The second backlight according to a preferred embodiment of the present invention may or may not include other components as long as it essentially includes such components. The configuration thereof is not especially limited. As preferable embodiments of the curved portion, the light source holder, and the light source housing member in the second backlight according to a preferred embodiment of the present invention, the same preferred embodiments as in the curved portion, the light source holder, and the light source housing member in the second liquid crystal display device according to a preferred embodiment of the present invention may be mentioned. Particularly, it is preferable that the curved portion reduces friction between the light source holder and the light source housing member. It is preferable that the backlight includes a light source behind a light-emitting surface of the backlight, and the light source holder is arranged in a peripheral region of the liquid source other than a region between the light-emitting surface of the backlight and the light source. Further, a preferred embodiment in which the backlight further includes a light guide plate behind a light-emitting surface of the backlight, the light source is arranged on a side of the light guide plate, and the light source holder is arranged in a peripheral region of the light source other than a region between the light guide plate and the light source (herein after, also referred to as "the fourth embodiment" is preferable. According to the fourth preferred embodiment, it is preferable that at least one of the light source holder and the light source housing member has a projection portion on a front surface side or aback surface side, and it is more preferable that at least one of the light source holder and the light source housing member has the projection portion on the front surface side.

A preferred embodiment of the present invention also provides a backlight including: a light source holder; a sliding member; and a light source housing member, the light source housing member integrally housing the light source holder and the sliding member, wherein at least one of the sliding member and the light source housing member has a projection portion, and the sliding member and the light source housing member are in contact with each other at the projection portion (herein after, also referred to as "the third backlight according to a preferred embodiment of the present invention"). According to a liquid crystal display device including such a backlight, defects such as deformation of the light source holder and the sliding member, and an inability of them to be inserted and pulled out can be effectively prevented and light sources can be easily exchanged. Accordingly, the third backlight according to a preferred embodiment of the present invention can be preferably used in a liquid crystal display device.

The third backlight according to a preferred embodiment of the present invention may or may not include other components as long as it essentially includes such components. The configuration thereof is not especially limited. As preferable embodiments of the projection portion, the light source holder, the sliding member, and the light source housing member in the third backlight according to a preferred embodiment of the present invention, the same preferred embodiments as in the projection portion, the light source holder, the sliding member, and the light source housing member in the third liquid crystal display device according to a preferred embodiment of the present invention may be mentioned. Particularly, it is preferable that the projection portion reduces friction between the sliding member and the light source housing member. It is preferable that the backlight includes a light source behind a light-emitting surface of the backlight, the light source holder is arranged in a peripheral region of the light source other than a region between the light-emitting surface of the backlight and the light source, the sliding member is arranged on both ends of the liquid source holder and has the projection portion on a back surface side (herein after, also referred to as "the fifth preferred embodiment"). According to the above-mentioned fifth preferred embodiment, it is preferable that the backlight includes a plurality of light source holders juxtaposed to each other, and at least one of the plurality of light source holders holds a plurality of light sources. It is more preferable that the backlight includes a plurality of light source holders juxtaposed to each other and each of the plurality of light source holders holds a plurality of light sources.

A preferred embodiment of the present invention also provides a backlight including: a light source holder; a sliding member; and a light source housing member, the light source housing member integrally housing the light source holder and the sliding member, wherein at least one of the sliding member and the light source housing member has a curved portion, and the sliding member and the light source housing member are in contact with each other at the curved portion (herein after, also referred to as "the fourth backlight according to a preferred embodiment of the present invention"). According to a liquid crystal display device including such a backlight, defects such as deformation of the light source holder and the sliding member, and an inability of them to be inserted and pulled out can be effectively prevented and light sources can be easily exchanged. Accordingly, the fourth backlight according to a preferred embodiment of the present invention can be preferably used in a liquid crystal display device.

The fourth backlight according to a preferred embodiment of the present invention may or may not include other components as long as it essentially includes such components. The configuration thereof is not especially limited. As preferable embodiments of the curved portion, the light source holder, the sliding member, and the light source housing member in the fourth backlight according to a preferred embodiment of the present invention, the same preferred embodiments as in the curved portion, the light source holder, the sliding member, and the light source housing member in the fourth liquid crystal display device according to a preferred embodiment of the present invention may be mentioned. Particularly, it is preferable that the curved portion reduces friction between the sliding member and the light source housing member. Further, it is preferable that the backlight includes a light source behind a light-emitting surface of the backlight, the light source holder is arranged in a peripheral region of the liquid source other than a region between the light-emitting surface of the backlight and the light source, and the sliding member is arranged on both ends of the liquid source and has the projection portion on a back surface side (herein after, also referred to as "the sixth preferred embodiment"). According to the above-mentioned sixth preferred embodiment, it is preferable that the backlight includes a plurality of light source holders juxtaposed to each other, and at least one of the plurality of light source holders holds a plurality of light sources. It is more preferable that the backlight includes a plurality of light source holders and each of the plurality of light source holders holds a plurality of light sources. In the third to sixth preferred embodiments, the peripheral region of the light source other than a region between the light-emitting surface of the backlight and the light source means a peripheral region of the light source other than a region of the light source on the light-emitting surface side of the backlight.

As mentioned above, the liquid crystal display device, the light source holder, the light source housing member, and the backlight according to various preferred embodiments of the present invention have common operation and effects. That is, the defects can be prevented and the light sources can be easily exchanged. Accordingly, a preferred embodiment in which the first to fourth liquid crystal display devices of the present invention are appropriately combined may be applied to the liquid crystal display device of the present invention. A preferred embodiment in which the first and second light source holders of the present invention are appropriately combined may be applied to the light source holder of the present invention. A preferred embodiment in which the first and second light source housing members of the present invention are appropriately combined may be applied to the light source housing member of the present invention. Further, a preferred embodiment in which the first to fourth backlights of the present invention are appropriately combined may be applied to the backlight of the present invention.

According to various preferred embodiments of the present invention, at least one of the light source holder or the sliding member and the light source housing member has at least one of the projection portion and the curved portion, the light source holder or the sliding member is in contact with the light source housing member at the projection portion and/or the curved portion. Therefore, defects such as deformation of light source holding members and an inability of them to be inserted and pulled out are effectively prevented, and the light sources can be easily exchanged.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
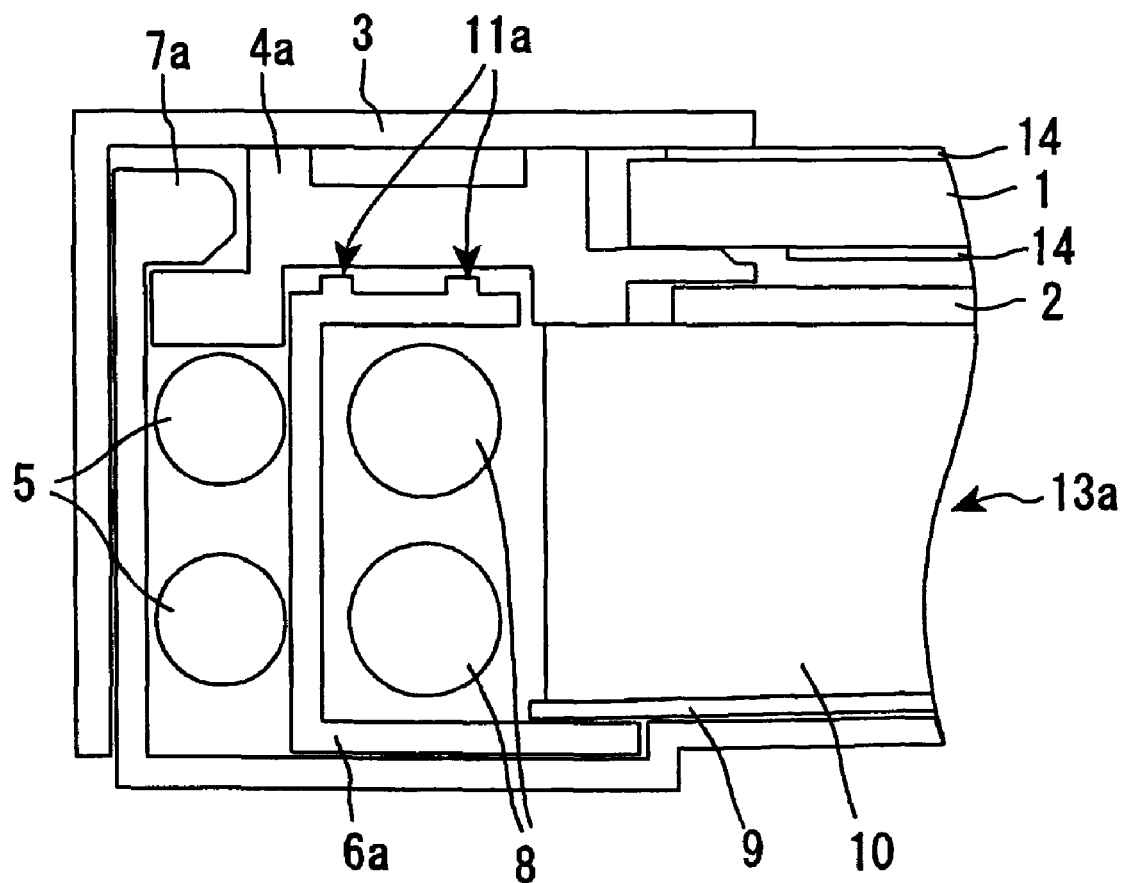
FIG. 1 shows a cross-sectional view schematically showing a cross-section of the liquid crystal display device in accordance with Preferred Embodiment 1, taken along line X-Y in FIG. 2A.

The present invention is mentioned in more detail below with reference to preferred embodiments shown in the drawings, but not limited to only these preferred embodiments.

Preferred Embodiment 1

Figure 2A:
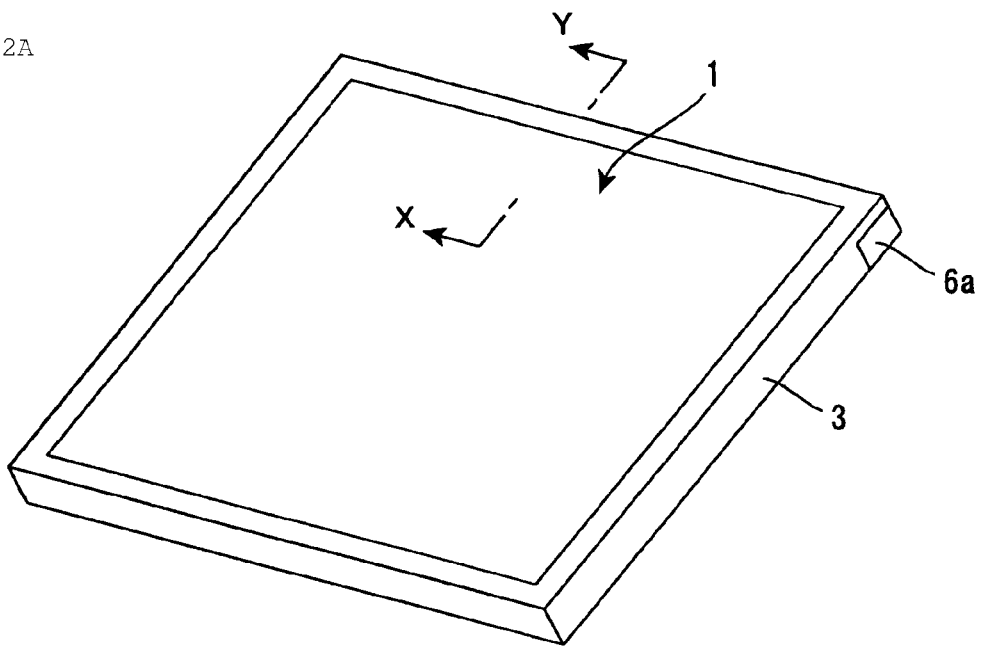
FIG. 2A is a perspective view of the liquid crystal display device in accordance with Preferred Embodiment 1, and schematically shows a state where the light source holder is completely housed within the backlight.
Figure 2B:
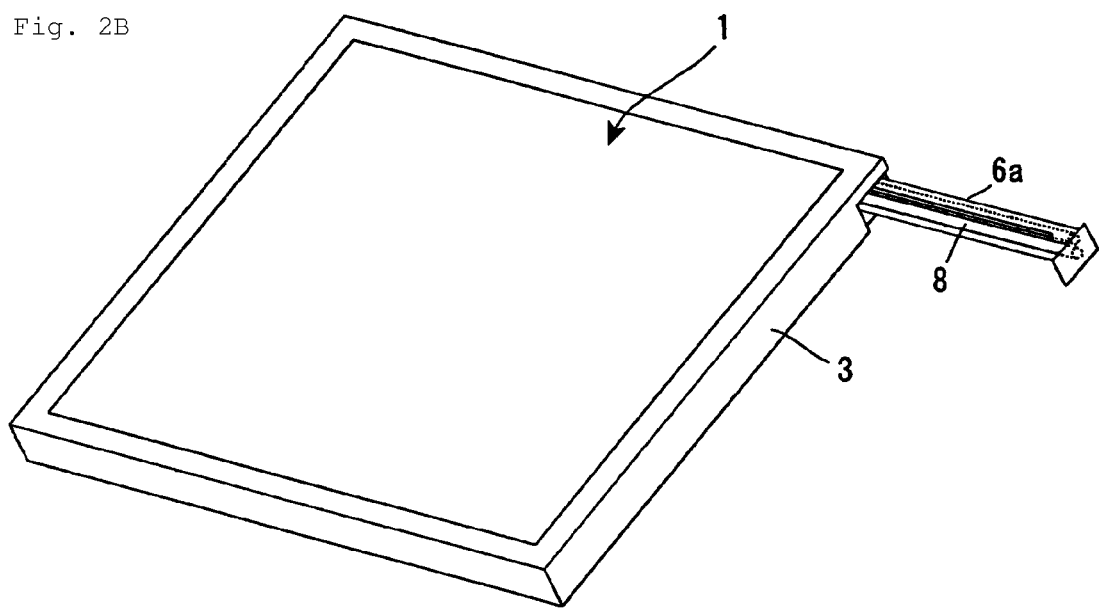
FIG. 2B is a perspective view of the liquid crystal display device in accordance with Preferred Embodiment 1, and schematically shows a state where the light source holder and the light sources held by the light source holder are partly pulled out of the backlight.

A liquid crystal display device in accordance with Preferred Embodiment 1 of the present invention is described with reference to FIGS. 1, 2A, and 2B. FIG. 1 is a cross-sectional view schematically showing a liquid crystal display device in accordance with a preferred embodiment of the present preferred embodiment, taken along line X-Y in FIG. 2A. FIG. 2A is a perspective view of the liquid crystal display device in accordance with the present preferred embodiment, and schematically shows a state where a light source holder is completely housed in a backlight. FIG. 2B is a perspective view of the liquid crystal display device in accordance with the present preferred embodiment, and schematically shows a state where the light source holder and light sources held by the light source holder are partly pulled out of the backlight.

The liquid crystal display device in accordance with the present preferred embodiment includes: a backlight 13a; an active matrix-driving liquid crystal display panel 1 arranged on the front surface side of the backlight 13a; and a front bezel 3 for fixing the liquid crystal display panel 1 to the backlight 13a.

The liquid crystal display panel 1 has the same configuration as in a common liquid crystal display panel. For simplification of drawings, each component is not illustrated. The liquid crystal display panel 1 includes: a TFT substrate including a thin film transistor (TFT), a bus line, a pixel electrode, a capacitance electrode and the like on a glass substrate; a CF substrate including a color filter (CF), a black matrix, a common electrode and the like on a glass substrate; and a liquid crystal layer interposed between the both substrate. The liquid crystal display panel 1 includes a polarizer 14 on the outside of each substrate and also includes a retarder (not shown) between the polarizer 14 and at least one of the substrates.

The backlight 13a is a so-called edge-type backlight and includes: a light guide plate 10 arranged behind the liquid crystal display panel 1; a reflective sheet 9 arranged on the back surface side of the light guide plate 10; an optical sheet 2 arranged on the front surface side of the light guide plate 10; a light source 8 arranged on the side of the light guide plate 10; a light source holder 6a arranged in a peripheral region of the light source 8 other than the region between the light guide plate 10 and the light source 8; a P bezel 4a arranged on the front surface side of the light source holder 6a; and a rear bezel 7a arranged on the back surface side of the light source holder 6a and the reflective sheet 9.

The light guide plate 10 reflects incident light from the light source by its back surface and disperses the light into a planar shape, thereby outputting the light to the liquid crystal display panel 1 side. An acrylic resin and the like may be used as the material for the light guide plate 10. The reflective sheet 9 is a member for preventing light from leaking from the back surface of the light guide plate 10. A resin sheet having a high reflectance and the like may be used. The optical sheet 2 is a member for optimizing optical characteristics such as directivity, for example, by collecting or diffusing the planar light output from the light guide plate 10. A diffusing sheet, a prism sheet, a lens sheet, and the like may be used as the optical sheet 2.

Two CCFTs that are linear light sources preferably are used as the light source 8. Both ends of the light source 8 are protected with a protective member (not shown) made of resin such as rubber. A lead wire 5 is drawn from each end. The light source 8 may have a preferred embodiment in which one or more LEDs that are point light sources are arranged on the light source holder 6a. According to such a preferred embodiment, low electrical power consumption and a long lifetime are permitted and a color reproduction range can be enlarged due to an increase in displayed colors.

The light source holder 6a preferably has a substantially rectangular body having a substantially square U-shaped cross section, that is, has a substantially rectangular body including an opened surface on the light guide plate 10 side. Further, the light source holder 6a holds the ends of the light source 8 with a protective material (not shown) made of resin such as rubber there between. The light source holder 6a is made of aluminum, and to its surface facing to the light source, a resin sheet (not shown) having a high reflectivity such as PET is attached. The light source holder 6a also serves as a reflector for reflecting light emitted from the light source 8. As a result, light can be more efficiently supplied for the light guide plate 10.

The P bezel 4a is arranged on the front surface side to be in contact with the light source holder 6a, the liquid crystal display panel 1, and the light guide plate 10. The rear bezel 7a is arranged on the back surface side to be in contact with the light source holder 6a and the reflective sheet 9. The P bezel 4a is engaged with the rear bezel 7a, thereby holding each component of the backlight 13a.

The P bezel 4a is preferably formed using a resin. The rear bezel 7a is preferably formed using aluminum. Thus, the light source holder 6a and the rear bezel 7a each include aluminum with an excellent heat conductivity and a certain level of a contact area between the light source holder 6a and the rear bezel 7a is secured. Therefore, heat generated in the light source 8 can be effectively released to the outside through the light source holder 6a and the rear bezel 7a according to the liquid crystal display device of the present preferred embodiment.

The light source holder 6a is detachably housed within the space between the P bezel 4a and the rear bezel 7a. Thus, if the light source holder 6a is arranged not to be completely fixed with the P bezel 4a and the rear bezel 7a, the light source 8 and the light source holder 6a can be integrally inserted and pulled out from the backlight 13a, as shown in FIGS. 2A and 2B. Under the state where the light source 8 and the light source holder 6a are completely housed in the backlight 13a, the light source holder 6a and the rear bezel 7a are fixed with a fixing member (not shown) such as a screw. Thus, in the liquid crystal display device of the present preferred embodiment, the P bezel 4a and the rear bezel 7a serve as the light source housing member. Also, in the following liquid crystal display devices in accordance with Preferred Embodiments 2 to 8, the P bezel and the rear bezel serve as the light source housing member.

Figure 3A:
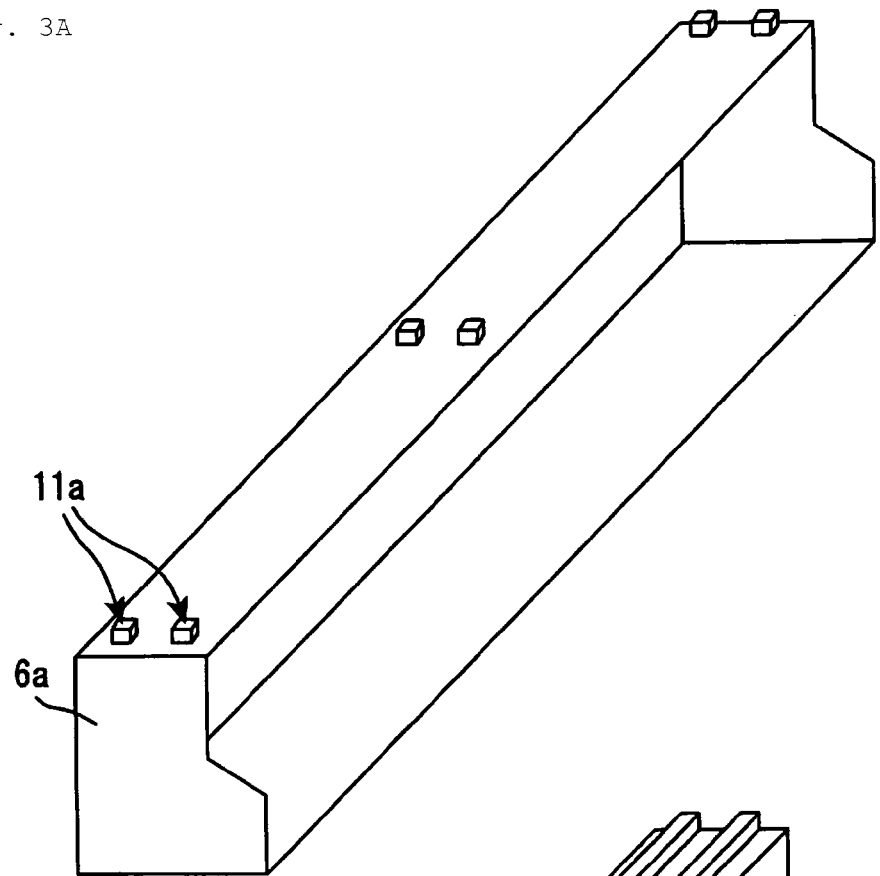
FIGS. 3A and 3B are perspective views each schematically showing the light source holder and the projection portion in the liquid crystal display device in accordance with Preferred Embodiment 1.
Figure 3B:
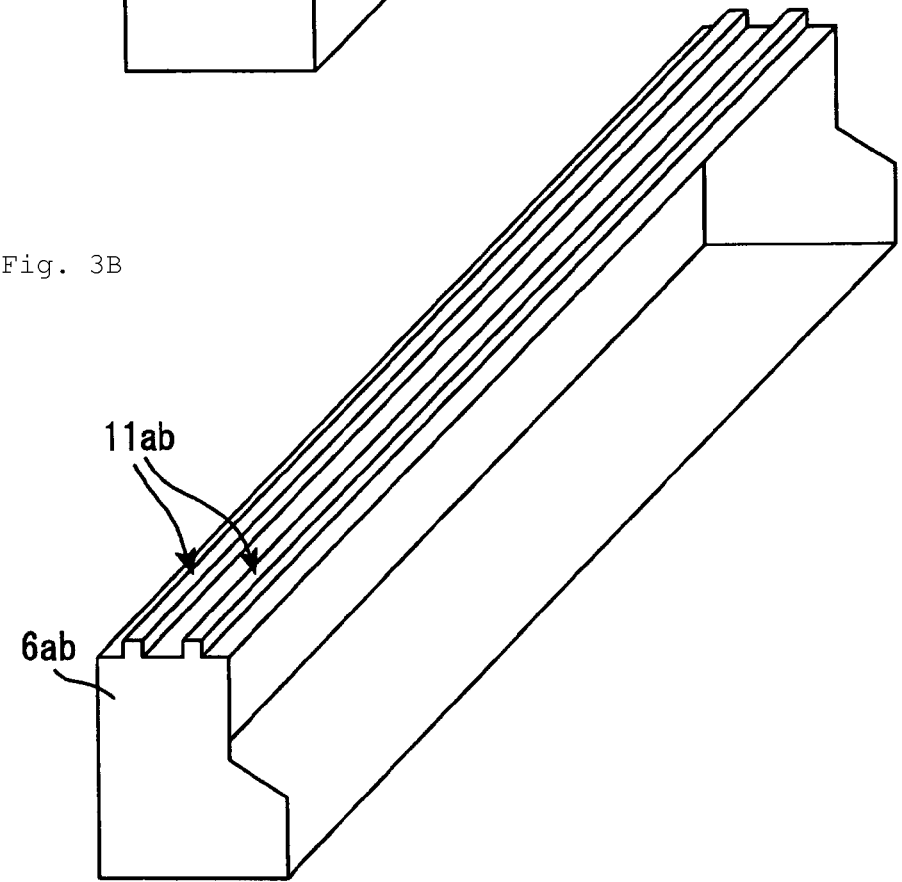

The light source holder 6a has a projection portion 11a on the front surface side and is in contact with the P bezel 4a at the projection portion 11a. Accordingly, the contact area between the light source holder 6a and the P bezel 4a is decreased, which can reduce friction between the light source holder 6a and the P bezel 4a when the light source holder 6a is inserted and pulled out. As shown in FIG. 3A, the projection portions 11a are arranged in a dot pattern. With respect to the preferred embodiment in which the projection portions are arranged, projection portions 11ab are linearly arranged in the light source holder 6ab, as shown in FIG. 3B, but it is preferable in view of reduction in friction between the light source holder and the light source housing member that the projection portions are arranged in a dot pattern. The projection portions 11a are arranged in two lines in a direction where the light source holder is slid, as shown in FIGS. 1, 3A and 3B. However, the projection portions 11a may be arranged in two or more lines or may be arranged in one line. The projection portions 11a are formed using aluminum as in the light source holder 6a and can be integrally formed with the light source holder 6a by an extrusion method, a casting method, a press processing, and the like. The projection portions 11a may be separately formed by being attached to the light source holder 6a by a joining method.

As mentioned above, in the liquid crystal display device of the present preferred embodiment, the friction between the light source holder and the bezel is small when the light source holder is inserted and pulled out. Therefore, according to such a liquid crystal display device including an edge-type backlight, defects such as deformation of light source holding members and an inability of the members to be inserted and pulled out are effectively prevented, and the light sources can be easily exchanged.

Preferred Embodiment 2

Figure 4A:
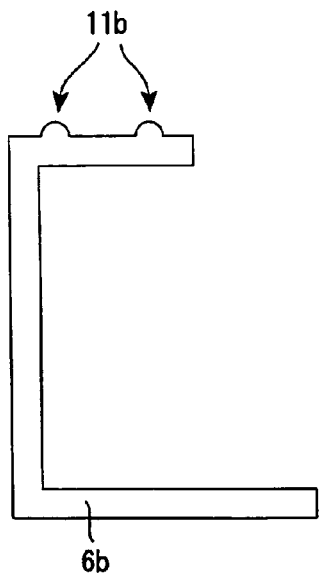
FIGS. 4A to 4C are cross-sectional views each schematically showing the light source holder and the projection portion in the liquid crystal display device in accordance with Preferred Embodiment 2.
Figure 4B:
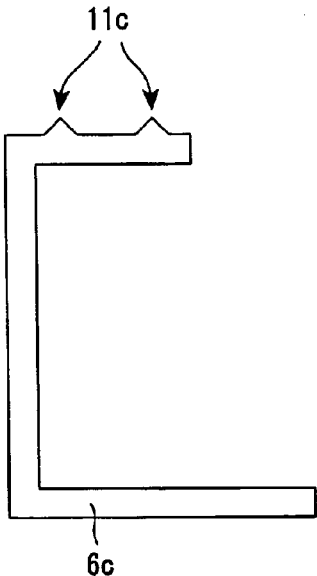
Figure 4C:
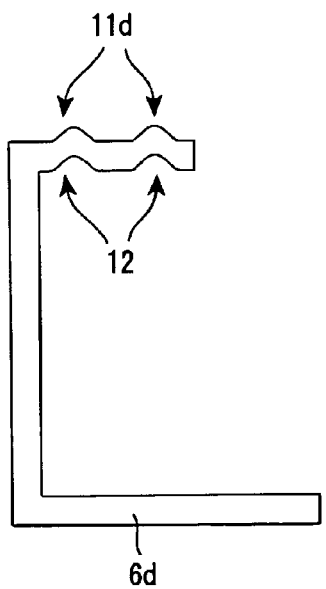

A liquid crystal display device in accordance with Preferred Embodiment 2 of the present invention is mentioned with reference to FIGS. 4A-4C. FIGS. 4A-4C are cross-sectional views schematically showing a light source holder in the liquid crystal display device in the present preferred embodiment. The same contents between Preferred Embodiment 1 and Embodiment 2 are omitted because the liquid crystal display device in the present preferred embodiment is different from that in Preferred Embodiment 1 only in the configuration of the light source holder.

In the liquid crystal display device in the present preferred embodiment, the light source holder has a projection portion, and the projection portion is in contact with the light source housing member substantially linearly or substantially at a point. Examples of such a projection portion includes a projection portion 11b having a substantially semicircular cross section, a projection portion 11c having a substantially triangular cross section, and a projection portion 11d having a wave-shaped cross section in the respective light source holders 6b, 6c and 6d. In the present description, the cross-section means a surface which is vertical to the light-emitting surface of the backlight and also vertical to the direction where the light source holder is slid. As a result, the liquid crystal display device in the present preferred embodiment can more effectively reduce the friction between the light source holder and the bezel when the light source holder is inserted and pulled out, in comparison to the liquid crystal display device in Preferred Embodiment 1 in which the projection portion (having a substantially square cross section) is in contact with the bezel surface. Therefore, the liquid crystal display device in the present preferred embodiment can more sufficiently exhibit the effects of the present invention. Projection portions shown in FIGS. 4A to 4C are arranged in a dot pattern in order to be in contact with the light source housing member substantially at a point, as shown in FIG. 3A. The projection portions in FIGS. 4A to 4C are arranged linearly in order to be in contact with the light source housing member substantially linearly, as shown in FIG. 3B. In a preferred embodiment of the present invention, at least one of the light source holder and the light source housing member may be provided with a depression 12 having a cross section with substantially the same shape as in the projection portion, on the side where the projection portions are not arranged.

Preferred Embodiment 3

Figure 5:
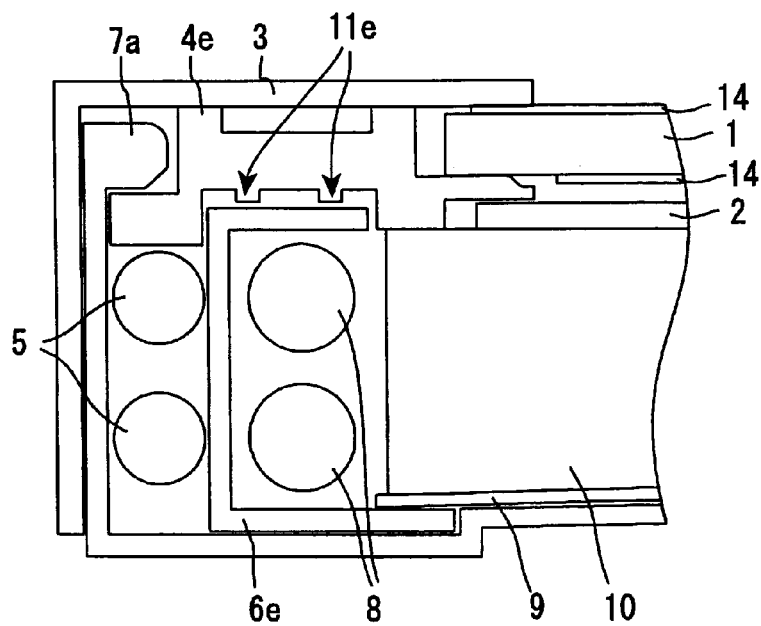
FIG. 5 is a cross-sectional view schematically showing the liquid crystal display device in accordance with Preferred Embodiment 3.

A liquid crystal display device in accordance with Preferred Embodiment 3 of the present invention is mentioned with reference to FIG. 5. FIG. 5 is a cross-sectional view schematically showing the liquid crystal display device in the present preferred embodiment. The same contents between Preferred Embodiment 1 and Preferred Embodiment 3 are omitted because the liquid crystal display device in the present preferred embodiment is different from that in Preferred Embodiment 1 only in the configurations of the light source holder and the bezel. In the present preferred embodiment, the same components as in the liquid crystal display device in accordance with Preferred Embodiment 1 are shown by the same symbols.

In the liquid crystal display device in the present preferred embodiment, as shown in FIG. 5, a light source holder 6e has no projection portion, and a P bezel 4e has projection portions 11e. According to this structure, the defects such as deformation of light source holding members and an inability of the members to be inserted and pulled out are effectively prevented and the light sources can be easily exchanged in the liquid crystal display device of the present preferred embodiment, as in the liquid crystal display device in Preferred Embodiment 1. If the projection portions are formed of a resin such as the P bezel 4e, the projection portions 11e can be integrally formed with the P bezel 4e by a molding process and the like.

Preferred Embodiment 4

Figure 6A:
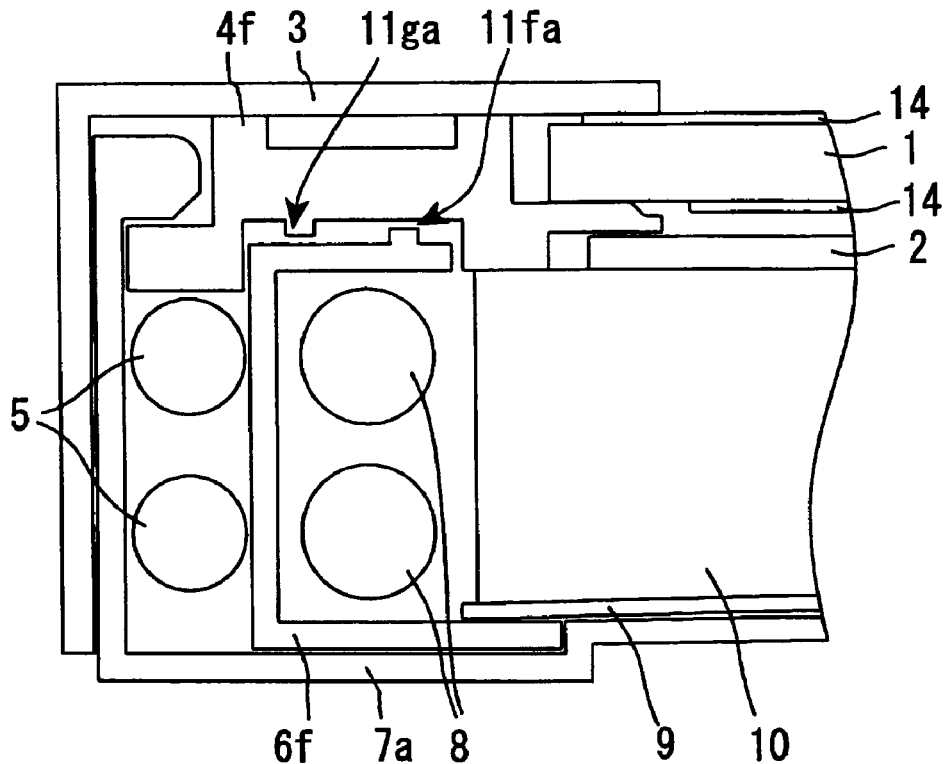
FIGS. 6A and 6B are cross-sectional views each schematically showing the liquid crystal display device in accordance with Preferred Embodiment 4.
Figure 6B:
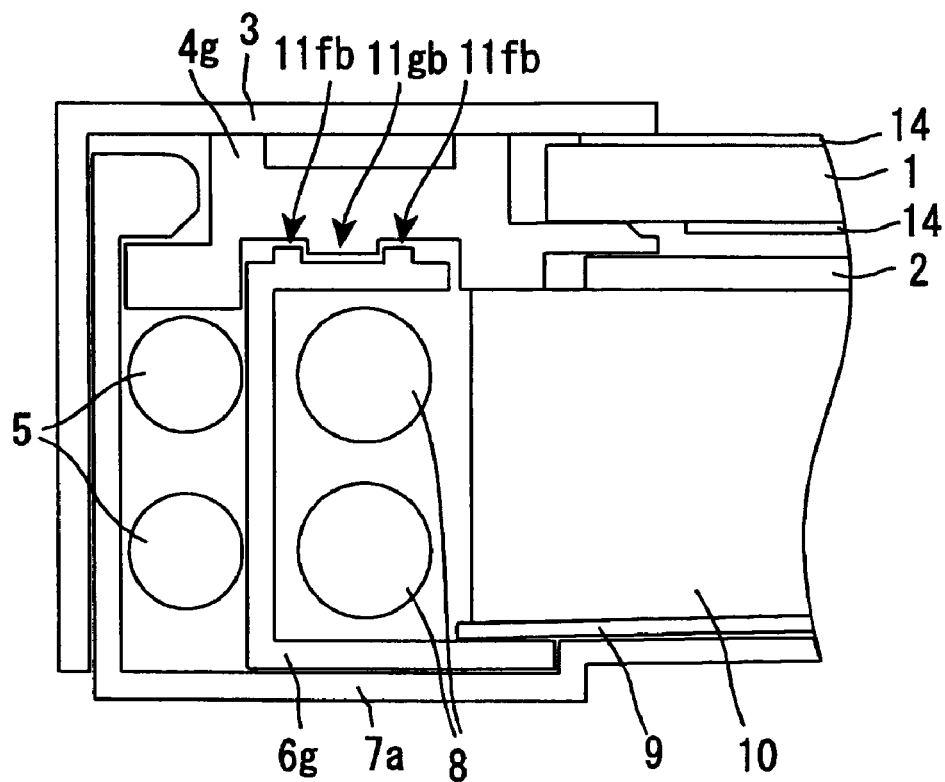

A liquid crystal display device of the present invention in accordance with Preferred Embodiment 4 is described with reference to FIGS. 6A and 6B. FIGS. 6A and 6B are cross-sectional views schematically showing the liquid crystal display device in accordance with the present preferred embodiment. The same contents between Preferred Embodiment 1 and Preferred Embodiment 4 are omitted because the liquid crystal display device in the present preferred embodiment is different from that in Preferred Embodiment 1 only in the configurations of the light source holder and the bezel. In the present preferred embodiment, the same components as in the liquid crystal display device in accordance with Preferred Embodiment 1 are shown by the same symbols.

In the liquid crystal display device in the present Embodiment, as shown in FIG. 6A, a light source holder 6f has a projection portion 11fa and a P bezel 4f has a projection portion 11ga. According to this, the defects such as deformation of light source holding members and an inability of the members to be inserted and pulled out are effectively prevented and the light sources can be easily exchanged in the liquid crystal display device of the present preferred embodiment, as in the liquid crystal display device in Preferred Embodiment 1. In the present preferred embodiment, it is preferable that a projection portion 11fb of a light source holder 6g is not engaged with a projection 11gb of a P bezel 4g, as shown in FIG. 6B, in order to reduce friction between the light source holder and the bezel. In a preferred embodiment of the present invention, it is preferable that one of the light source holder and the bezel (light source holder) has a projection portion in view of simplification of production processes.

Preferred Embodiment 5

Figure 7A:
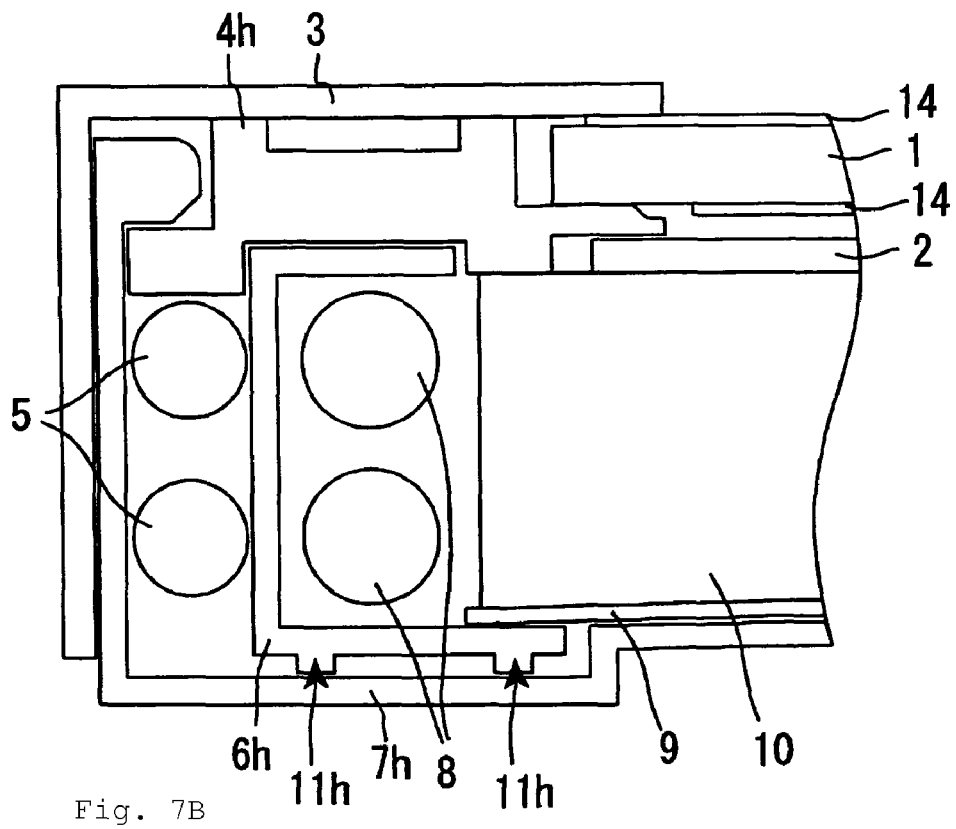
FIGS. 7A and 7B are cross-sectional views each schematically showing the liquid crystal display device in accordance with Preferred Embodiment 5.
Figure 7B:
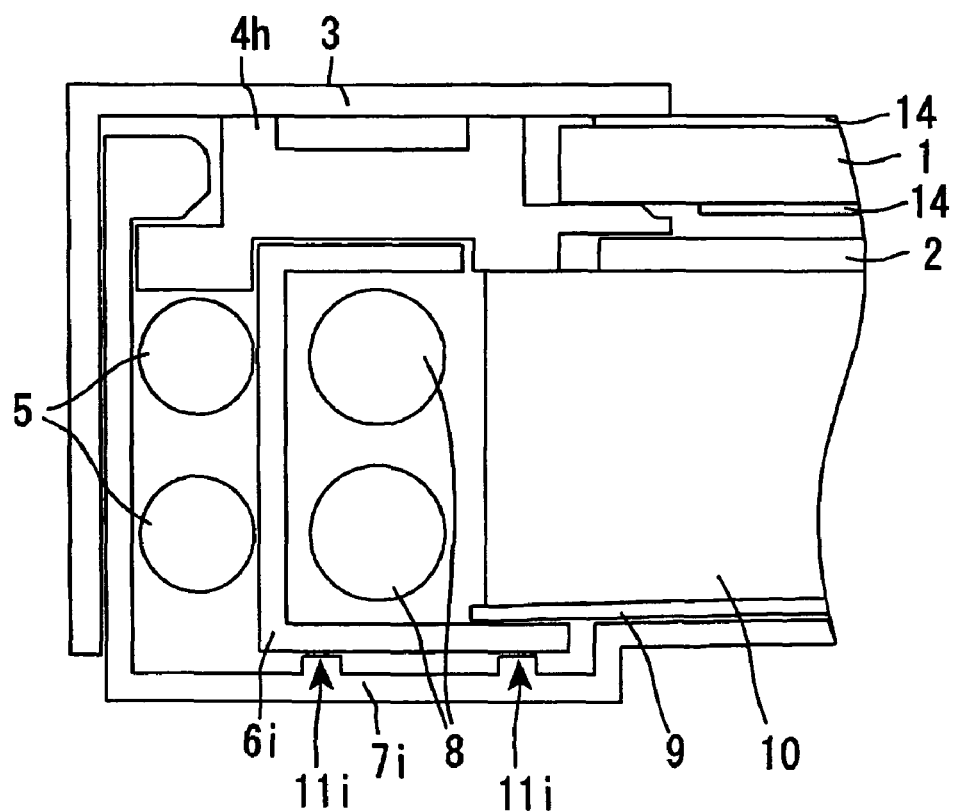

A liquid crystal display device of the present invention in accordance with Preferred Embodiment 5 is mentioned with reference to FIGS. 7A and 7B. FIGS. 7A and 7B are cross-sectional views schematically showing the liquid crystal display device in the present preferred embodiment. The same contents between Preferred Embodiment 1 and Preferred Embodiment 5 are omitted because the liquid crystal display device in the present preferred embodiment is different from that in Preferred Embodiment 1 only in the configurations of the light source holder and the bezel. In the present preferred embodiment, the same components as in the liquid crystal display device in accordance with Preferred Embodiment 1 are shown by the same symbols.

In the liquid crystal display device in the present preferred embodiment, a light source holder 6h has a projection portion 11h on the back surface side, as shown in FIG. 7A. In this preferred embodiment, the liquid crystal display device also has a light source holder 6h and a P bezel 4h that are not in contact with one another in the vicinity of the projection portion 11h. According to this, the friction between the light source holder 6h and the rear bezel 7h can be reduced, and therefore, the defects such as deformation of light source holding members and an inability of the members to be inserted and pulled out are effectively prevented, and the light sources can be easily exchanged. The configuration of the liquid crystal display device in the present preferred embodiment might be disadvantage in the following point. The contact area between the light source holder 6h and the rear bezel 7h each formed using aluminum with an excellent heat conductivity is reduced, and thereby the heat is not efficiently released and reaches the liquid crystal display panel 1. As a result, displayed qualities are adversely effects. The liquid crystal display device in the present preferred embodiment may have a rear bezel 7i including a projection portion 11i, as shown in FIG. 7B. In this preferred embodiment, the projection portion 11i is not included on the light source holder 6i.

Preferred Embodiment 6

Figure 8:
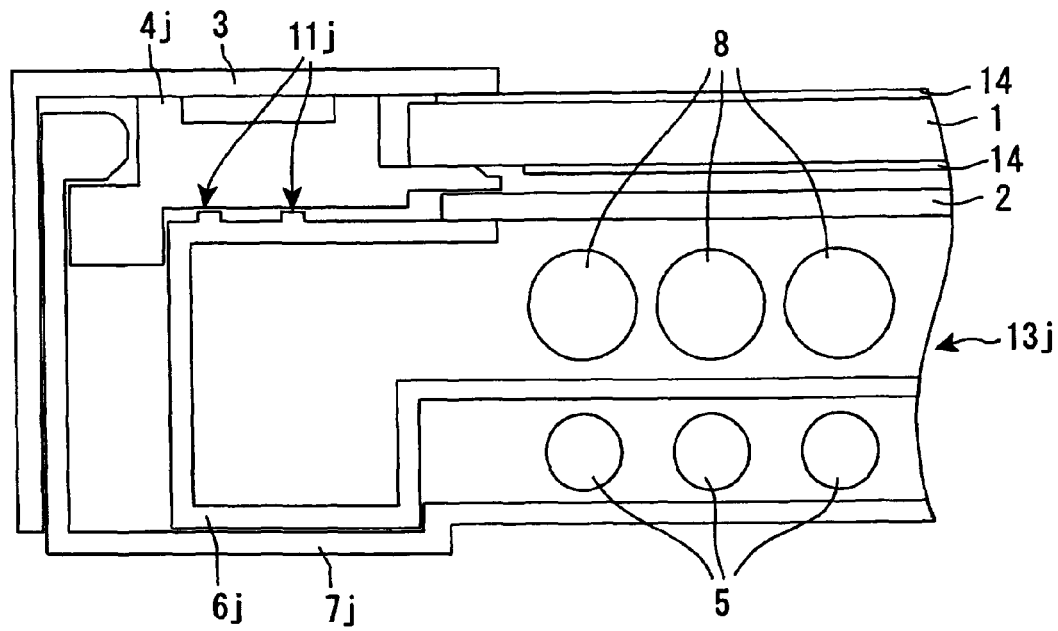
FIG. 8 is a cross-sectional view schematically showing the liquid crystal display device in accordance with Preferred Embodiment 6.

A liquid crystal display device of the present invention in accordance with Preferred Embodiment 6 is mentioned with reference to FIG. 8. FIG. 8 is a cross-sectional view schematically showing the liquid crystal display device in the present preferred embodiment. The same contents between Preferred Embodiment 1 and Preferred Embodiment 2 are omitted because the liquid crystal display device in the present preferred embodiment is different from that in Preferred Embodiment 1 only in the configuration of the backlight. In the present preferred embodiment, the same components as in the liquid crystal display device in accordance with Preferred Embodiment 1 are shown by the same symbols.

In the liquid crystal display device in the present preferred embodiment, a backlight 13j is a so-called direct-type backlight, and includes: the light source 8 arranged behind the liquid crystal display device; a light source holder 6j arranged in a peripheral region of the light source 8 other than the region between the liquid crystal display panel 1 and the light source 8 (a region other than the region on the front surface side of the light source 8); a P bezel 4j arranged on the front surface side of a peripheral portion of the light source holder 6j; and a rear bezel 7j arranged on the back surface side of the light source holder 6j. The P bezel 4j is preferably formed using a resin. The rear bezel 7j is preferably formed using aluminum. The P bezel 4j and the rear bezel 7j have almost the same preferred embodiments as in the P bezel 4a and the rear bezel 7a in Preferred Embodiment 1, respectively.

A plurality of CCFTs that are linear light sources are used as the light source 8. The light source 8 is held by being inserted into an opening (not shown) formed in the side surface facing the light source 8 of the rear bezel 7j. Further, the lead wire 5 is drawn from the light source 8. The peripheral portion of the light source holder 6j is processed into a plate shape. Over the entire surface of the light-emitting surface, the light sources 8 are arranged. The light source holder 6j also serves as a reflector, as in Preferred Embodiment 1.

The light source holder 6j is detachably housed within the space between the P bezel 4j and the rear bezel 7j. Further, the P bezel 4j and the rear bezel 7j holds the ends of the light source holder 6j. According to this, the light source 8 and the light source holder 6j can be integrally inserted and pulled out of the backlight 13j. In addition, the light source holder 6j has projection portions 11j on the front surface side and is in contact with the P bezel 4j at the projection portions 11j. According to this, the friction between the light source holder 6j and the P bezel 4j can be reduced as in Preferred Embodiment 1. Thus, in the liquid crystal display device in the present preferred embodiment, the friction between the light source holder 6j and the P bezel 4j is small. Therefore, according to such a liquid crystal display device including a direct-type backlight, the defects such as deformation of light source holding members and an inability of the members to be inserted and pulled out are effectively prevented and the light sources can be easily exchanged.

Preferred Embodiment 7

Figure 9:
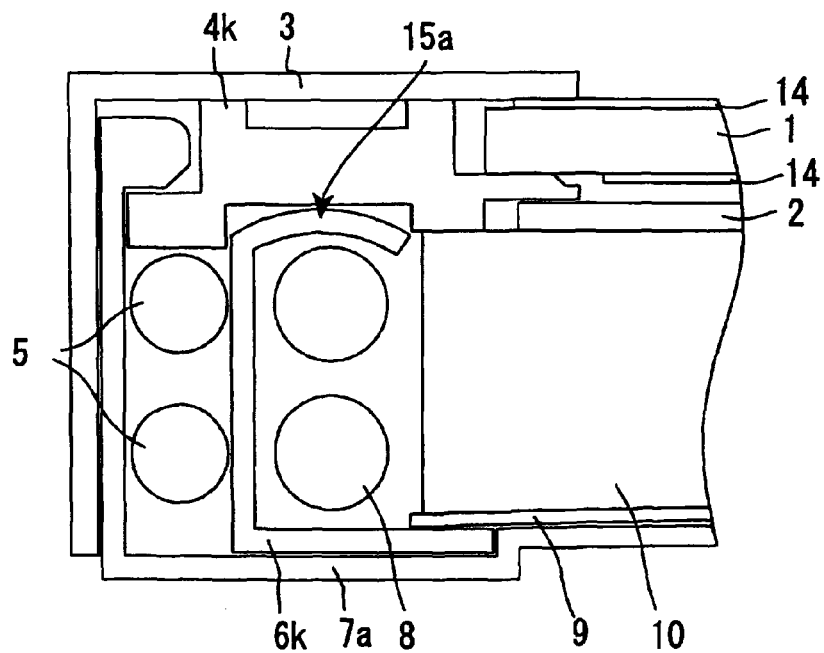
FIG. 9 is a cross-sectional view schematically showing the liquid crystal display device in accordance with Preferred Embodiment 7.

A liquid crystal display device of the present invention in accordance with Preferred Embodiment 7 is mentioned with reference to FIG. 9. FIG. 9 is a cross-sectional view schematically showing the liquid crystal display device in the present preferred embodiment. The same contents between Preferred Embodiment 1 and Preferred Embodiment 7 are omitted because the liquid crystal display device in the present preferred embodiment is different from that in Preferred Embodiment 1 only in the configuration of the light source holder. In the present preferred embodiment, the same components as in the liquid crystal display device in accordance with Preferred Embodiment 1 are shown by the same symbols.

Figure 10A:
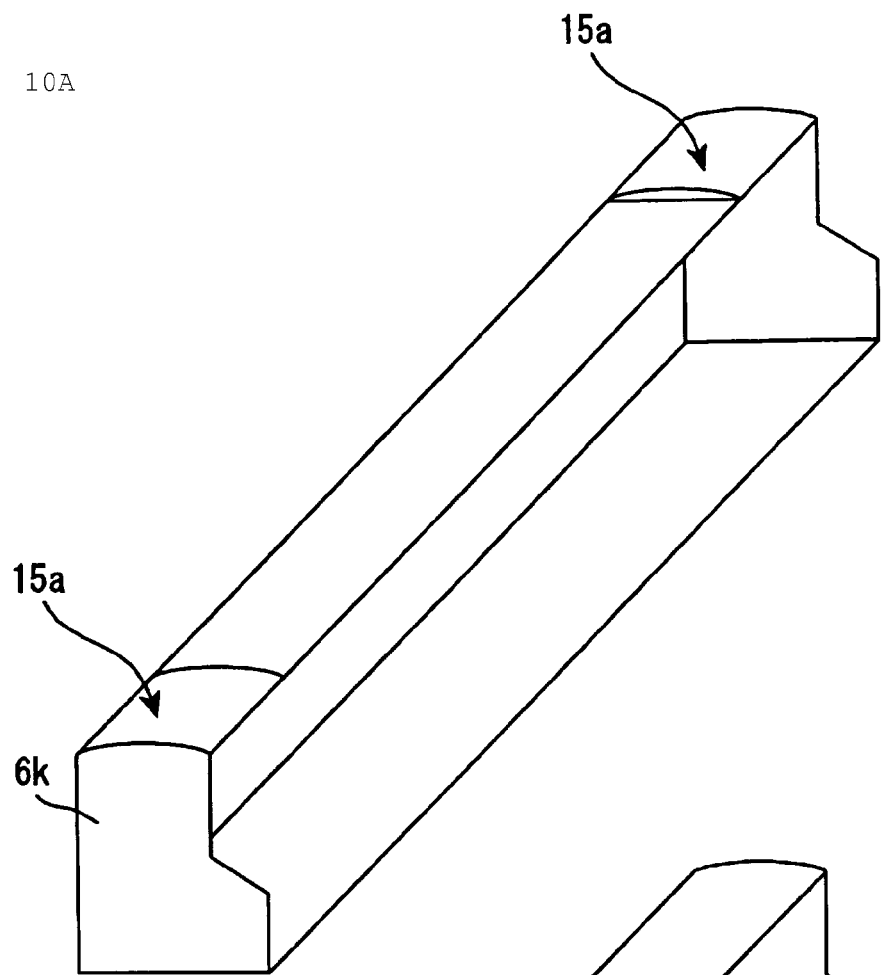
FIGS. 10A and 10B are perspective views each schematically showing the light source holder and the projection portion in the liquid crystal display device in accordance with Preferred Embodiment 7.
Figure 10B:
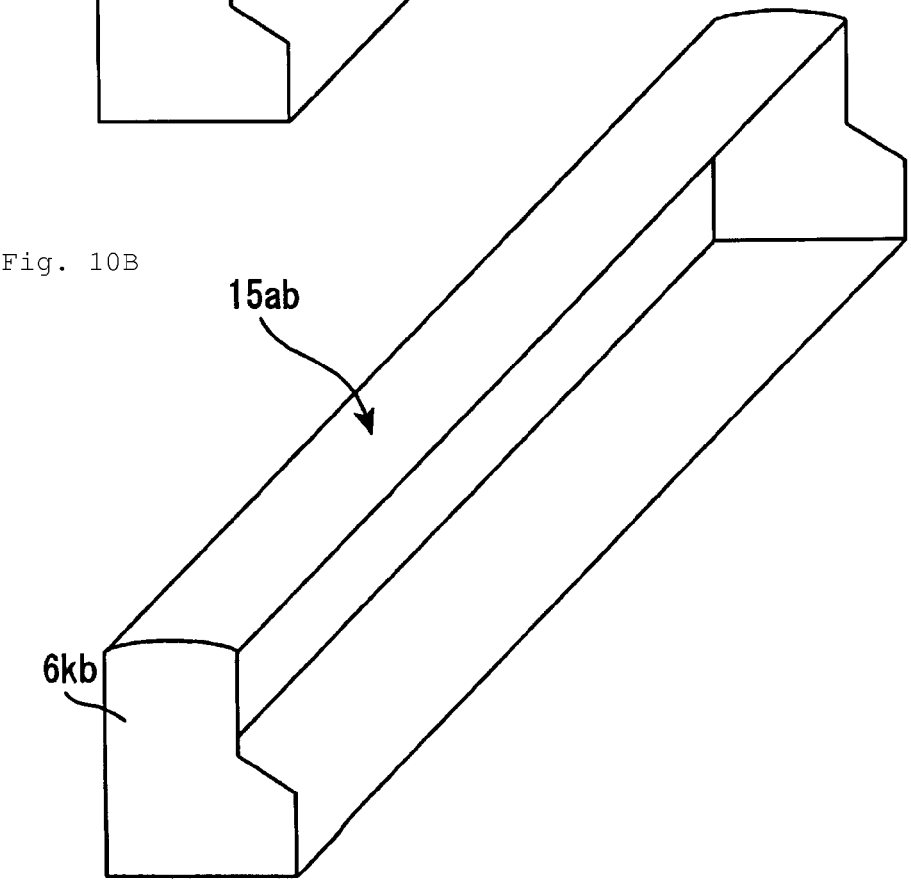
Figure 11:
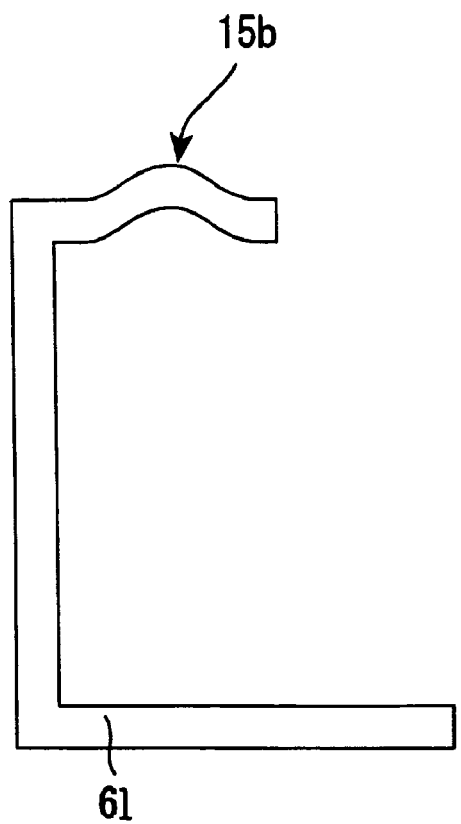
FIG. 11 is a cross-sectional view schematically showing another light source holder and another projection portion in the liquid crystal display device in accordance with Preferred Embodiment 7.

In the liquid crystal display device in the present preferred embodiment, as shown in FIG. 9, a light source holder 6k has a curved portion 15a on the front surface side, and is in contact with a P bezel 4k at the curved portion 15a. According to this, the friction between the light source holder 6k and the rear bezel 4k can be reduced, as in Preferred Embodiment 1. Therefore, the defects such as deformation of light source holding members and an inability of the members to be inserted and pulled out are effectively prevented and the light sources can be easily exchanged. The curved portion 15a is partly arranged in the region where the light source holder 6k faces the P bezel 4k. With respect to the preferred embodiment in which the curved portion is arranged, a curved portion 15ab is entirely arranged in the region where the light source holder 6kb faces the P bezel 4k, as shown in FIG. 10B, but it is preferable in view of reduction in friction between the light source holder and the light source housing member that the curved portion is partly arranged. The curved portion may be a curved portion 15b having a wave-shaped cross section arranged on a surface of a light source holder 6l, as shown in FIG. 11.

Preferred Embodiment 8

A liquid crystal display device of the present invention in accordance with Preferred Embodiment 8 is mentioned with reference to FIGS. 13A to 17B. In the present preferred embodiment, the same components as in the liquid crystal display device in accordance with Preferred Embodiment 1 are shown by the same symbols.

Figure 13A:
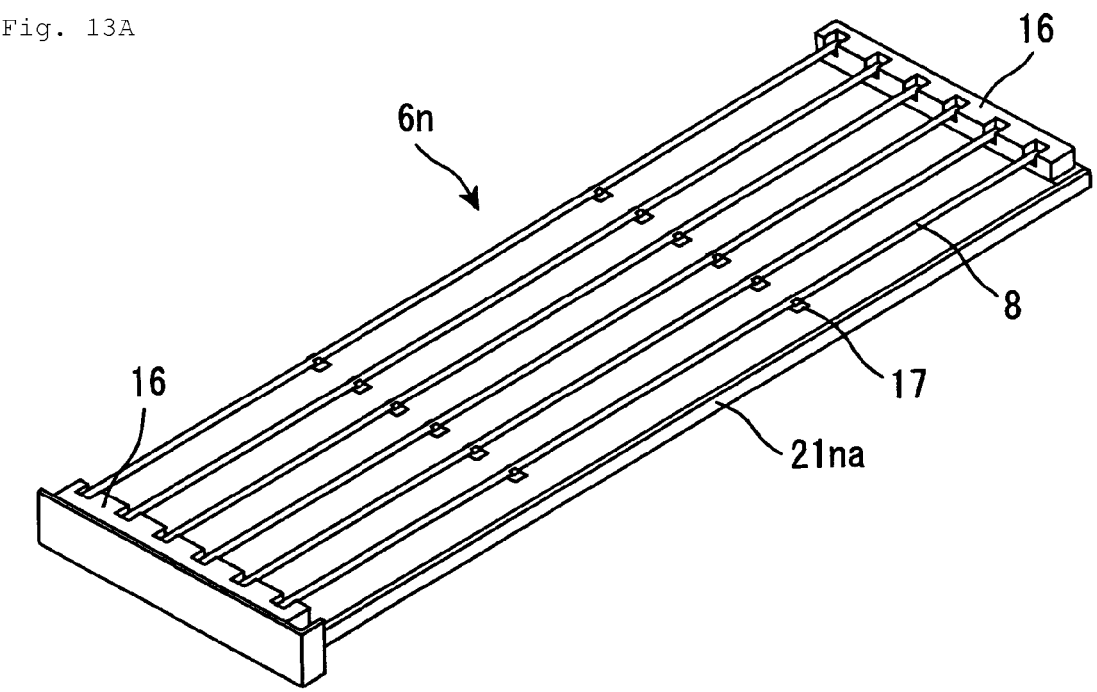
FIG. 13A is a perspective view schematically showing the light source holder and the sliding member in the liquid crystal display device in accordance with Preferred Embodiment 8.
Figure 13B:
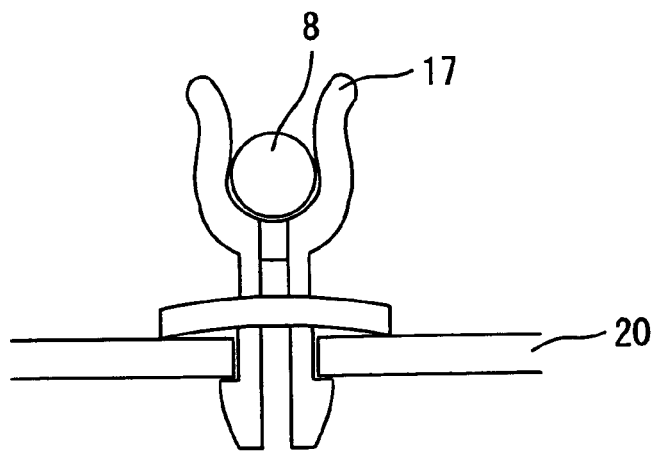
FIG. 13B is a side view schematically showing a grip holder in the liquid crystal display device in accordance with Preferred Embodiment 8.

FIG. 13A is a perspective view schematically showing a light source holder and a sliding member in a liquid crystal display device in the present preferred embodiment. FIG. 13B is a side view schematically showing a grip holder in the liquid crystal display device of the present preferred embodiment. In the liquid crystal display device in the present preferred embodiment, a light source holder 6n has a plate body with a substantially square shape. On the surface facing the liquid crystal panel, a plurality of CCFTs as the light source 8 are juxtaposed to each other. The light source holder 6n includes an end holder 16 and a grip holder 17. The end holder 16 holds the end of the light source 8. The grip holder 17 arranged on the surface facing the liquid crystal panel holds the light source 8. The grip holder 17 grips the light source 8, as shown in FIG. 13B. Each of the end holder 16 and the grip holder 17 is formed using a resin. A lead wire (not shown) of the light source 8 is drawn to the surface opposite to the light source 8 of the light source holder 6n. The light source 8 is connected to an inverter board (not shown), through the lead wire, arranged on the surface opposite to the light source 8 of the light source holder 6n. A sliding member is arranged on the ends on the back surface side of the light source holder 6n. The sliding member is mentioned below.

Figure 14:
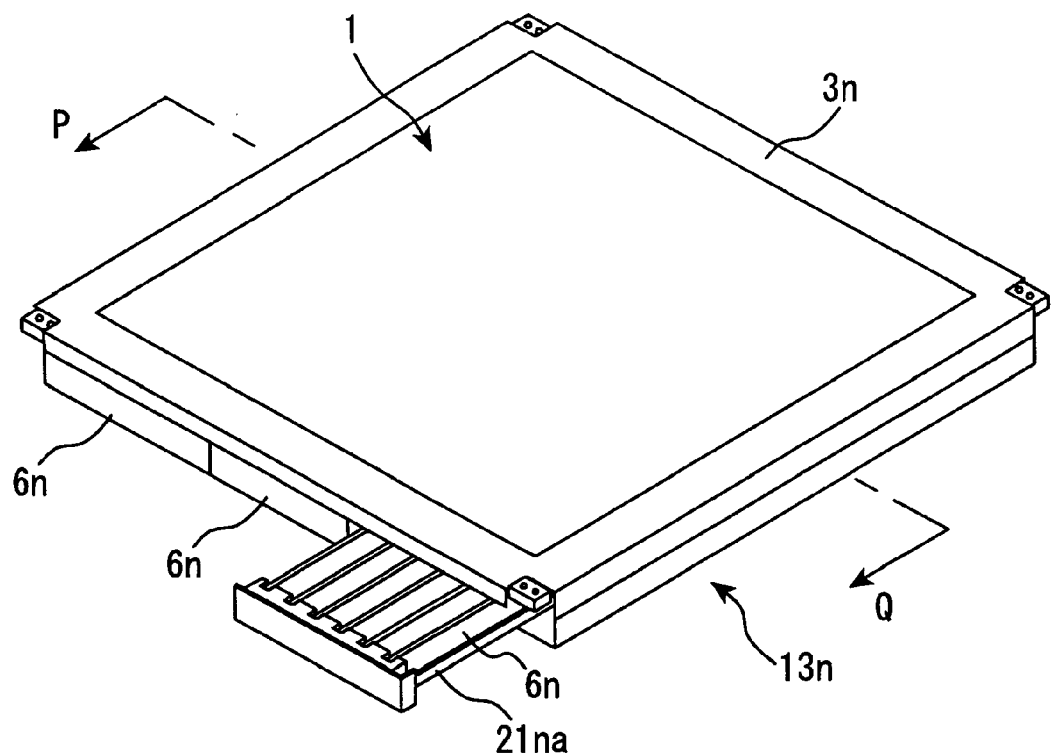
FIG. 14 is a perspective view of the liquid crystal display device in accordance with Preferred Embodiment 8 and schematically showing a state where the light source holder, the sliding member, and the light sources held by the light source holder are partly pulled out of the backlight.

FIG. 14 is a perspective view of the liquid crystal display device in the present preferred embodiment and schematically showing a state where the light source holder, the sliding member, and the light sources held by the light source holder are partly pulled out of the backlight. According to a backlight 13n in the present preferred embodiment, three separate light source holders 6n are juxtaposed to each other and detachably housed in the same direction. Accordingly, the backlight 13n is a direct-type backlight including three separate light source holders. Thus, a plurality of separate light source holders is formed, and thereby the strength of the light source holders each including an aluminum plate can be generally increased. Therefore, the deformation of the light source holders is prevented even if the liquid crystal display panel is large in size. Further, the light sources can be exchanged with efficiency because a plurality of light sources held by each light source holder can be inserted and pulled out at one time.

Figure 15:
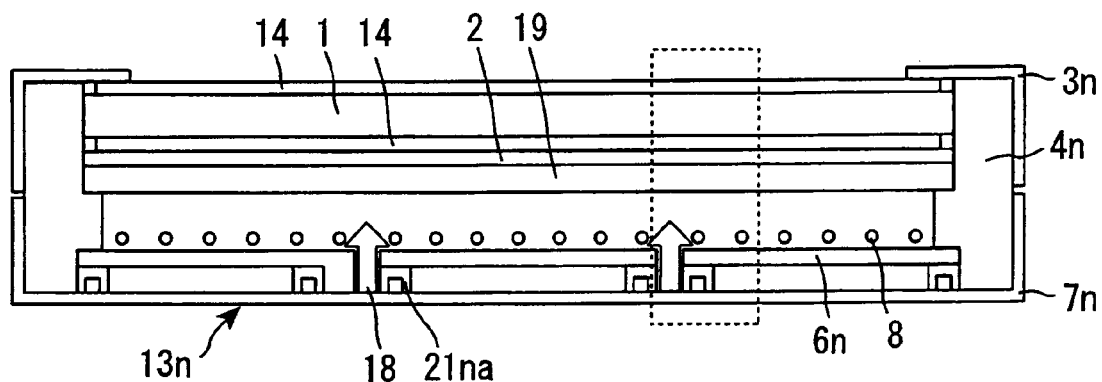
FIG. 15 is a cross-sectional view schematically showing the liquid crystal display device in accordance with Preferred Embodiment 8, taken along line P-Q in FIG. 14.

FIG. 15 is a cross-sectional view schematically showing the liquid crystal display device in the present preferred embodiment, taken along line P-Q in FIG. 14.

As shown in FIG. 15, the backlight 13n includes a frame 18 as the light source housing member, in addition to the P bezel 4n and the rear bezel 7n. The frame 18 has a substantially arrow-shaped cross section. The frame 18 is placed between the two separate light source holders 6n, thereby holding the separate light source holders 6n. A resin which is excellent in smoothing property, processability, strength, and heat stability is excellent as a material for the frame 18. Polycarbonate and the like may be used, for example.

According to the backlight 13n, the sliding member 21na is arranged at both ends on the back surface side of the light source holder 6n. The sliding member 21na has a substantially square U-shaped cross section. The sliding member 21na has a function of sliding the light source holder 6n and mainly is in contact with the light source housing member. The sliding member 21na is fixed to the light source holder 6n with a fixing member (not shown) such as a screw. According to this structure, the light source holders 6n can be inserted and pulled out of the light source housing member, as shown in FIG. 14. That is, the light source holders 6n on the both ends are detachably housed within the space surrounded by the P bezel 4n, the rear bezel 7n, and the frame 18, and each held at both ends where the sliding member 21na is arranged. Further, the light source holder 6n at the center is detachably housed within the space between the rear bezel 7n and the frame 18, and held at both ends where the sliding member 21na is arranged. A resin which is excellent in smoothing property, processability, strength, and heat stability is excellent as a material for the sliding member 21na. Polycarbonate and the like may be used, for example.

According to the liquid crystal display device in the present preferred embodiment, in a region facing the light source 8, a diffuser 19 that is an optical member with a high strength, the optical sheet 2, and the liquid crystal display panel 1 including a polarizer 14 on both surfaces, are stacked in this order from the light source 8 side. Each of the members is held by the P bezel 4n and the front bezel 3n.

Figure 16:
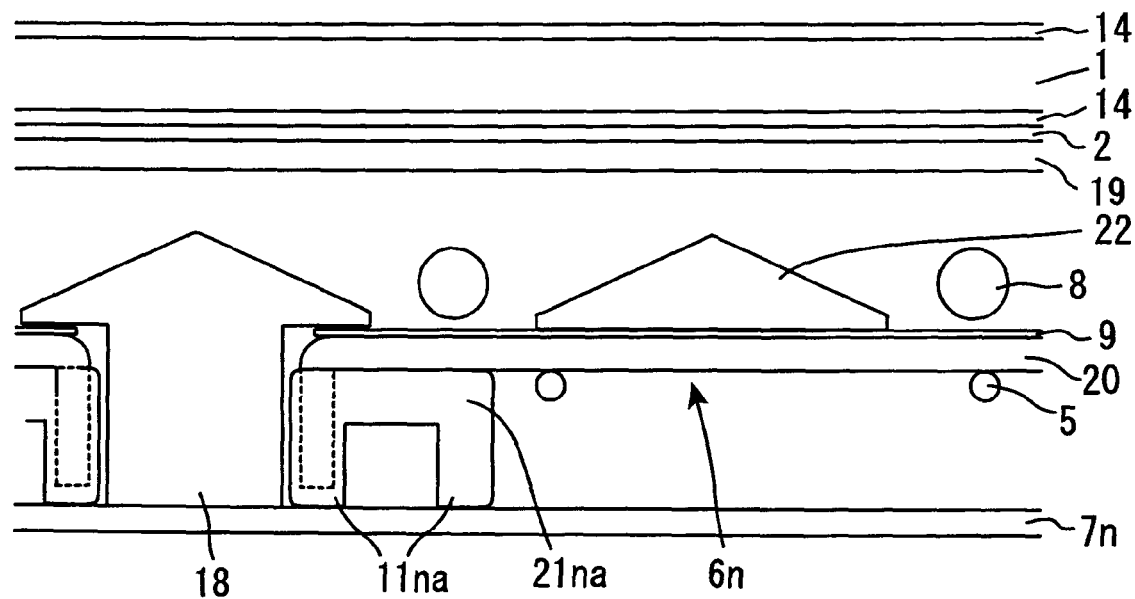
FIG. 16 is an enlarged view schematically showing a cross section of the region shown by the broken line in FIG. 15.

FIG. 16 is an enlarged view schematically showing a cross section of the region shown by the broken line in FIG. 15.

As shown in FIG. 16, the light source holder 6n further includes a lamp tray 20, a reflective sheet 9, and a reflective projection portion 22, in addition to the above-mentioned end holder 16 and the grip holder 17.

The lamp tray 20 is a component serving as a framework of the light source holder 6n, and it is made of aluminum with an excellent heat conductivity. According to this, the heat generated in the light sources 8 can be efficiently released to the outside, as in Preferred Embodiment 1. The lamp tray 20 is formed using an aluminum plate with a thickness larger than that of the light source holder (for example, 1 mm in thickness) in the edge-type backlight. According to this structure, the strength can be sufficiently secured. However, the use of such a thick aluminum plate reduces a processability of the lamp tray. Accordingly, the sliding member made of a resin excellent in processability is separately arranged, and thereby both of the strength and the processability can be satisfied in the light source holder and the sliding member of the present preferred embodiment.

The reflective sheet 9 is a component for efficiently supplying the light emitted from the light source 8 for the liquid crystal display panel 1. As in Preferred Embodiment 1, a resin sheet with a high reflectance may be used, for example.

The reflective projection portion 22 is a reflective member having a substantially mountain-shaped cross section. Due to this reflective projection portion 22, light reflected by the reflective sheet 9 is effectively suppressed from entering into the light source 8 again and being absorbed. Therefore, the light use efficiency can be improved. The same material as in the frame 18 can be preferably used as the material for the reflective projection portion 22.

Thus, the light source holder 6n also serves as a reflector as in Preferred Embodiment 1. The cross section on the liquid crystal display panel 1 side of the above-mentioned frame 18 that is a light source housing member is designed to have substantially the same shape as in the cross section of the reflective projection portion 22. The light sources 8 are arranged at equal spaces on each light source holder 6n, as shown in FIG. 15. Therefore, uneven luminance is effectively suppressed from being generated at the interface between two light source holders 6n.

The sliding member 21na has a projection portion 11na on the back surface side and is in contact with the rear bezel 7n at the projection portion 11na. Thus, the sliding member is formed to have a substantially square U-shaped cross section and provided with the projection portions, and thereby the friction between the sliding member and the rear bezel can be reduced. Therefore, the defects such as deformation of the light source holder and an inability of it to be inserted and pulled out are prevented and the light sources can be easily exchanged. If a resin is used as the material for the sliding member 21na, the sliding member having the projection portions can be easily formed by a molding process and the like.

The light source holder 6n and the sliding member 21na may be assembled by the following method. The sliding member 21na is fixed to the molded lamp tray 20 with a fixing member such as a screw, first. Then, the reflective sheet 9 is attached to the lamp tray 20 with an adhesive such as a double-faced tape. Finally, the grip holder 17, the end holder 16, and the reflective projection portion 22 may be attached to the lamp tray 20.

Figure 17A:
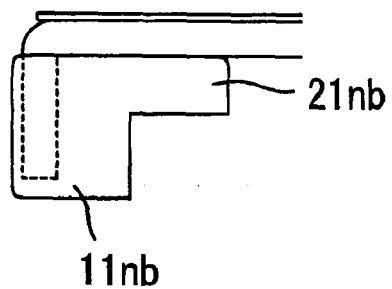
FIGS. 17A and 17B are cross-sectional views each showing another embodiment of the sliding member in accordance with Preferred Embodiment 8.
Figure 17B:
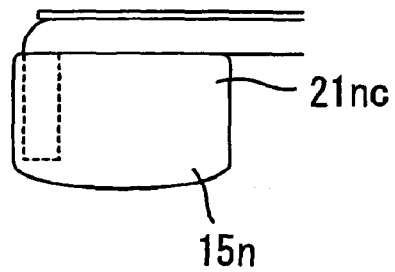

Thus, the present preferred embodiment is preferably applied to a liquid crystal display device which includes a relatively large panel and a direct-type backlight. In the present preferred embodiment, the projection portions may be arranged in a dot pattern or linearly arranged, as in Preferred Embodiment 1. According to the liquid crystal display device in the present preferred embodiment, the projection portion 11nb may be formed in such a way that the sliding member 21nb has a substantially L-shaped cross section, as shown in FIG. 17A. In the liquid crystal display device in accordance with the present preferred embodiment, a sliding member 21nc has a curved portion 15n and is in contact with the light source housing member at the curved portion 15n, as shown in FIG. 17B.

The present invention has been mentioned in detail with reference to Preferred Embodiments 1 to 8. It should be understood that the various preferred embodiments mentioned in Preferred Embodiments 1 to 8 can be appropriately combined.

Comparative Embodiment 1

Figure 12:
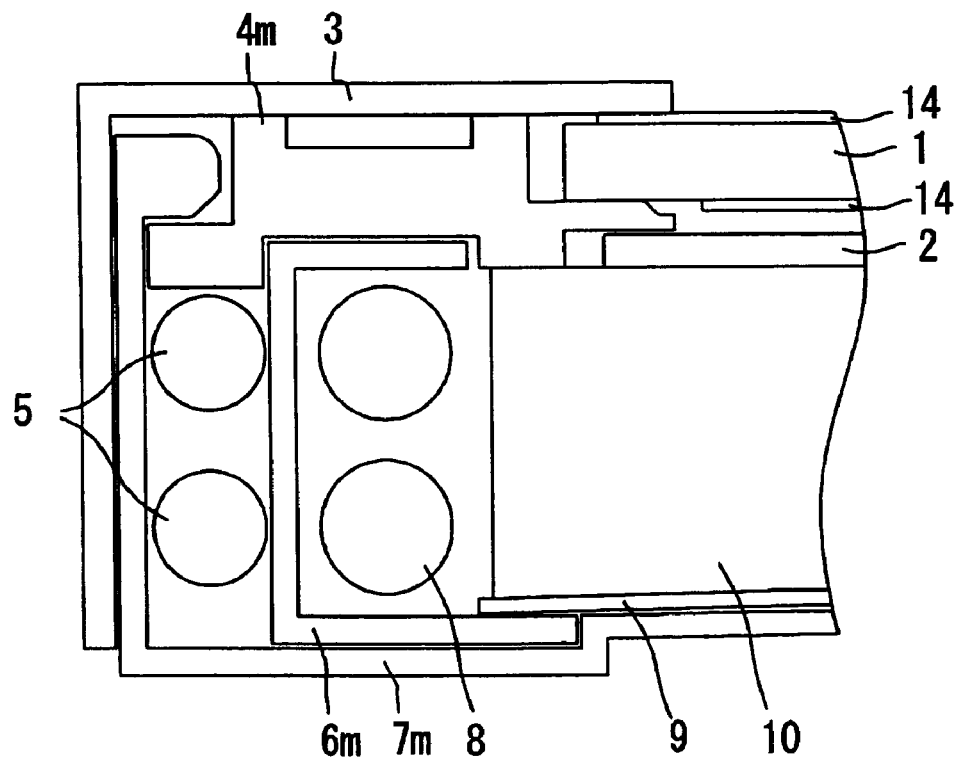
FIG. 12 is a cross-sectional view schematically showing the liquid crystal display device in accordance with Comparative Embodiment 1.

A liquid crystal display device in accordance with Comparative Embodiment 1 is mentioned with reference to FIG. 12. FIG. 12 is a cross-sectional view schematically showing the liquid crystal display device in the present Comparative Embodiment. The same contents between Preferred Embodiment 1 and Comparative Embodiment 1 are omitted because the liquid crystal display device in the present Comparative Embodiment is different from that in Preferred Embodiment 1 only in the configurations of the light source holder and the bezel. In the present Comparative Embodiment, the same components as in the liquid crystal display device in accordance with Preferred Embodiment 1 are shown by the same symbols.

In the liquid crystal display device in accordance with the present Comparative Embodiment, a light source holder 6m, a P bezel 4m, and a rear bezel 7m each have neither a projection portion nor a curved portion. Accordingly, light sources cannot be easily exchanged because the friction among the light source holder 6m, and the P bezel 4m and the rear bezel 7m is large. Therefore, the defects such as deformation of the light source holder and an inability of it to be inserted and pulled out might be generated.

Comparative Embodiment 2

Figure 18A:
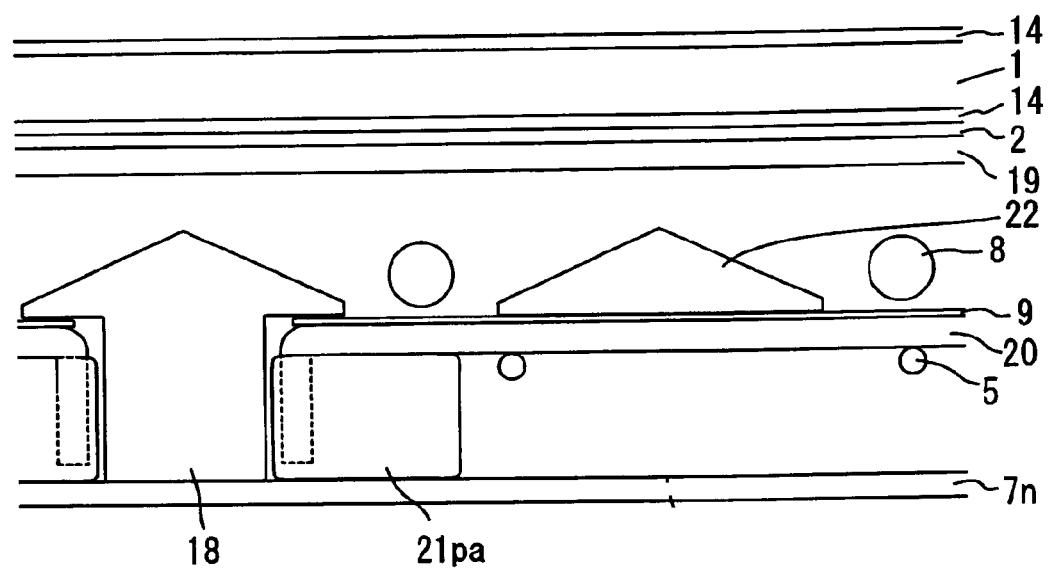
FIG. 18A is a cross-sectional view schematically showing the liquid crystal display device in accordance with Comparative Embodiment 2.
Figure 18B:
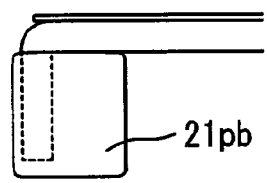
FIG. 18B is a cross-sectional view schematically showing another embodiment of the sliding member in Comparative Embodiment 2.

A liquid crystal display device in accordance with Comparative Embodiment 2 is mentioned with reference to FIGS. 18A and 18B. FIGS. 18A and 18B are cross sectional views schematically showing a sliding member in the liquid crystal display device in the present Comparative Embodiment. The same contents between Preferred Embodiment 8 and Comparative Embodiment 2 are omitted because the liquid crystal display device in the present Comparative Embodiment is different from that in Preferred Embodiment 8 only in the configuration of the sliding member. In the present Comparative Embodiment, the same components as in the liquid crystal display device in accordance with Preferred Embodiment 8 are shown by the same symbols.

The liquid crystal display device in accordance with the present Comparative Embodiment, the sliding member 21pa has neither a projection portion nor a curved portion, as shown in FIG. 18A. Accordingly, according to the liquid crystal display device in the present Comparative Embodiment, the friction between the sliding member 21a and the rear bezel 7n is large. Therefore, the defects such as deformation of the light source holder and the sliding member and an inability of them to be inserted and pulled out might be generated and light sources might not be easily exchanged. If the sliding member 21pb is formed to have a uniformly thin width, as shown in FIG. 18B, in the liquid crystal display device in the present Comparative Embodiment, the friction between the sliding member 21pb and the rear bezel 7n is reduced. However, the strength of the sliding member is significantly reduced, and as a result, the sliding member is deformed when the light sources are exchanged.

The present application claims priority under the Paris Convention and the domestic law in the country to be entered into national phase on Patent Application No. 2006-35658 filed in Japan on Feb. 13, 2006, and Patent Application No. 2006-117025 filed in Japan on Apr. 20, 2006, the entire contents of which are hereby incorporated by reference.

In the present description, the terms "or more" mean that the value described is included.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
a backlight including a light source holder and a light source housing member housing the light source holder; wherein
at least one of the light source holder and the light source housing member has a projection portion;
the light source holder and the light source housing member are in contact with each other at the projection portion; and
the light source holder is arranged to slide against the light source housing member at the projection portion when the light source holder is inserted or removed from the light source housing member.

2. The liquid crystal display device according to claim 1, wherein the projection portion is arranged to reduce friction between the light source holder and the light source housing member.

3. The liquid crystal display device according to claim 1, wherein the backlight further includes a light guide plate behind a liquid crystal display panel,
a light source is arranged on a side of the light guide plate, and the light source holder is arranged in a peripheral region of the light source other than a region between the light guide plate and the light source.

4. The liquid crystal display device according to claim 3, wherein at least one of the light source holder and the light source housing member has the projection portion disposed on a front surface side or a back surface side.

5. The liquid crystal display device according to claim 3, wherein at least one of the light source holder and the light source housing member has the projection portion disposed on the front surface side.

6. The liquid crystal display device according to claim 1, wherein the backlight is a direct-type backlight.

7. A liquid crystal display device comprising:
a backlight including a light source holder and a light source housing member housing the light source holder; wherein
at least one of the light source holder and the light source housing member has a curved portion;
the light source holder and the light source housing member are in contact with each other at the curved portion; and
the light source holder is arranged to slide against the light source housing member at the curved portion when the light source holder is inserted or removed from the light source housing member.

8. A backlight comprising:
a light source holder; and
a light source housing member housing the light source holder; wherein
at least one of the light source holder and the light source housing member has a projection portion;
the light source holder and the light source housing member are in contact with each other at the projection portion; and
the light source holder is arranged to slide against the light source housing member at the projection portion when the light source holder is inserted or removed from the light source housing member.

9. A backlight comprising:
a light source holder; and
a light source housing member housing the light source holder; wherein
at least one of the light source holder and the light source housing member has a curved portion;
the light source holder and the light source housing member are in contact with each other at the curved portion; and
the light source holder is arranged to slide against the light source housing member at the curved portion when the light source holder is inserted or removed from the light source housing member.

10. A liquid crystal display device comprising:
a backlight including a light source holder, a sliding member, and a light source housing member housing the light source holder and the sliding member; wherein
at least one of the sliding member and the light source housing member has a projection portion;

the sliding member and the light source housing member are in contact with each other at the projection portion; and the backlight is a direct-type backlight.

11. The liquid crystal display device according to claim 10, wherein the projection portion is arranged to reduce friction between the sliding member and the light source housing member.

12. The liquid crystal display device according to claim 10, wherein the sliding member is arranged on both ends of the liquid source holder and has the projection portion on a back surface side.

13. A liquid crystal display device comprising:
a backlight including a light source holder, a sliding member, and a light source housing member housing the light source holder and the sliding member; wherein
at least one of the sliding member and the light source housing member has a projection portion;
the sliding member and the light source housing member are in contact with each other at the projection portion;
the backlight includes a light source behind a liquid crystal display panel, the light source holder is arranged in a peripheral region of the light source other than a region between the liquid crystal display panel and the light source, and the sliding member is arranged on both ends of the liquid source holder and has the projection portion on a back surface side; and
the backlight includes a plurality of light source holders juxtaposed to each other, and at least one of the plurality of light source holders holds a plurality of light sources.

14. A liquid crystal display device comprising:
a backlight including a light source holder, a sliding member, and a light source housing member housing the light source holder and the sliding member; wherein
at least one of the sliding member and the light source housing member has a curved portion; and
the sliding member and the light source housing member are in contact with each other at the curved portion.

15. A backlight comprising:
a light source holder;
a sliding member; and
a light source housing member housing the light source holder and the sliding member; wherein
at least one of the sliding member and the light source housing member has a projection portion;
the sliding member and the light source housing member are in contact with each other at the projection portion; and
the backlight is a direct-type backlight.

16. A backlight comprising:
a light source holder;
a sliding member; and
a light source housing member housing the light source holder and the sliding member; wherein
at least one of the sliding member and the light source housing member has a curved portion; and
the sliding member and the light source housing member are in contact with each other at the curved portion.

17. The liquid crystal display device according to claim 3, wherein:
the projection portion is arranged on a front surface side of the light source holder; and
no projection portion is arranged on a back surface side of the light source holder.

18. The liquid crystal display device according to claim 1, wherein the projection portion does not come into contact with any lamp.

19. The liquid crystal display device according to claim 2, wherein the friction that is reduced is caused by relative movement between the light source holder and the light source member.

* * * * *